United States Patent [19]

Fukuoka et al.

[11] Patent Number: 5,253,412
[45] Date of Patent: Oct. 19, 1993

[54] TIP PROCESSING APPARATUS FOR JACKETED OPTICAL FIBERS

[75] Inventors: Satoshi Fukuoka; Shizuka Yamaguchi; Koji Sasaki; Tsuyoshi Fumeno, all of Ichihara, Japan

[73] Assignee: The Furukawa Electric Co., Ltd., Tokyo, Japan

[21] Appl. No.: 866,795

[22] Filed: Apr. 8, 1992

[30] Foreign Application Priority Data

Apr. 12, 1991 [JP] Japan ................. 3-080153
Apr. 12, 1991 [JP] Japan ................. 3-080154
Apr. 12, 1991 [JP] Japan ................. 3-080155

[51] Int. Cl.$^5$ ............................ B26F 3/00
[52] U.S. Cl. .................... 29/566.3; 15/256.6; 29/564.4; 29/720; 81/9.51; 225/96.5
[58] Field of Search ............. 29/566.3, 564.4, 564.3, 29/564.6, 564.8, 566.1, 720; 15/256.5, 256.6; 225/96, 96.5; 81/9.51

[56] References Cited

U.S. PATENT DOCUMENTS 4,087,908  5/1978  Fusco et al. .......... 29/564.4 X
4,852,244  8/1989  Lukas ................ 29/566.3

FOREIGN PATENT DOCUMENTS 0295374  12/1988  European Pat. Off. .
0320978   6/1989  European Pat. Off. .
0362950   4/1990  European Pat. Off. .
55-144444 11/1980  Japan .
57-8504    1/1982  Japan .
62-87908   4/1987  Japan .
WO83/02269 7/1983  World Int. Prop. O. .

Primary Examiner—Joseph M. Gorski
Attorney, Agent, or Firm—Frishauf, Holtz, Goodman & Woodward

[57] ABSTRACT

A tip processing apparatus is equipped with a holder, and a holder fiber holding unit for extending the tip of the jacketed optical fiber comprising at least one optical fiber provided with a jacket, the holder holding the jacketed optical fiber in place. The apparatus also includes a jacket removing unit for removing a desired length of the jacket, leaving the jacket on the tip of the jacketed optical fiber; a cleaning unit for cleaning the optical fiber exposed by the jacket removal carried out in the jacket removing unit; and a cutting unit for performing cut processing thereby to trim the optical fiber cleaned by the cleaning unit. A tip processing method comprises moving a portion of the jacket by a desired length while leaving a portion of the jacket on the tip, and all processing steps of the jacket removing, cleaning, and cutting of the optical fiber are performed on the optical fiber with the jacket left on the tip.

7 Claims, 23 Drawing Sheets

F I G. 16
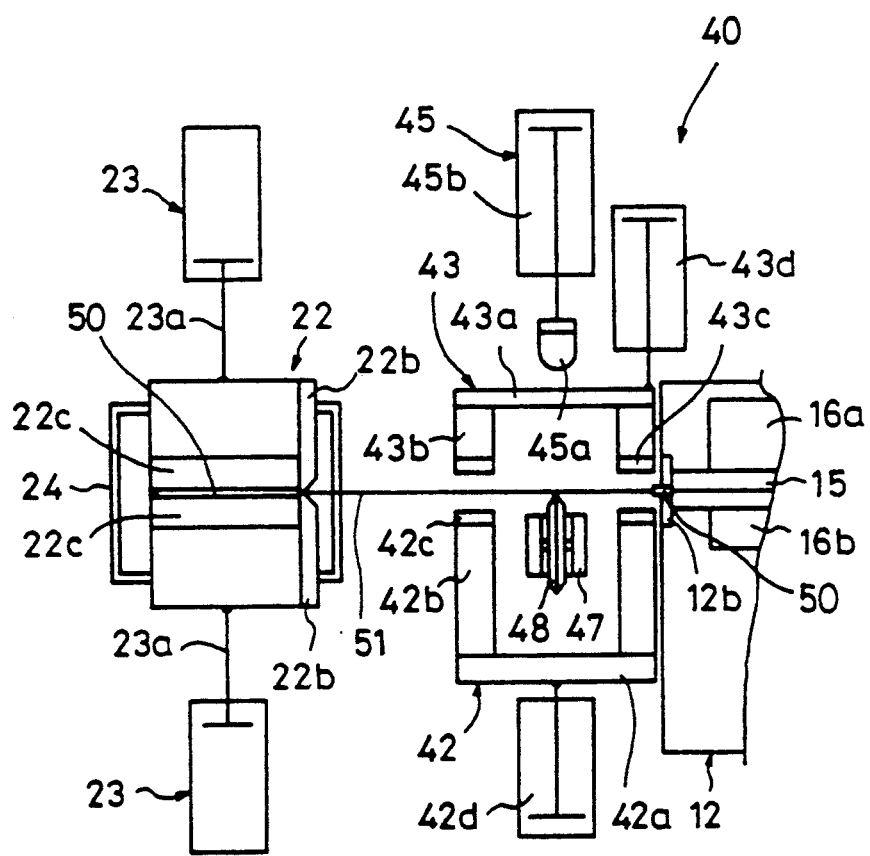

TIP PROCESSING APPARATUS FOR JACKETED OPTICAL FIBERS

BACKGROUND OF THE INVENTION

1. Field of the Invention

The present invention relates to a tip processing method for a jacketed optical fiber, and a multi-functional tip processing apparatus for a jacketed optical fiber which enables a plurality of processing operations related to the tip processing to be performed automatically by a single apparatus in accordance with the foregoing method.

2. Description of Related Arts

Tip processing of a jacketed optical fiber is performed prior to an optical connection with an optical device for inspection of the jacketed optical fiber comprising optical fibers provided with a jacket, or an optical connection or the like with other jacketed optical fibers. This tip processing refers to steps of processing rendered on the tip of a jacketed optical fiber, including removal of a jacket, cleaning of exposed optical fibers, and cutting of the optical fibers to a specified length, an and object thereof is to minimize a connection loss in optical connection to achieve proper optical connection.

Conventionally, such tip processing has been performed manually, with workers using different jigs for different processing steps, manually performing tip processing operations such as removing the jacket, cleaning, and cutting. As a result, tip processing of many jacketed optical fibers, as in the processing of an optical fiber cable, which is a collection of a number of jacketed optical fibers, has posed a problem of a long processing time and low operation efficiency because of the manual work.

In particular, for a multicore fiber such as a fiber ribbon, which consists of multiple optical fibers arranged in parallel, covered for protection with a jacket made of synthetic resin or the like, and molded into a tape, the tip processing results in the loss of the jacket that holds the optical fibers together, causing the optical fibers at the tip to separate and become loose. Therefore, workers faced the problem of not being able to cut the tips of the optical fibers to the same length, unless they rearranged the separated optical fibers in parallel and clamped them onto a cutting jig or the like.

Furthermore, if the tips of all the optical fibers were not cut to the same length, problems arose during optical connection with other multicore fibers, optical equipment, etc., including prevention of proper optical connection with corresponding optical fibers or with optical equipment and damaging of the optical fibers at the other end of the optical connection.

For these reasons, automation of a jacketed optical fiber tip processing was difficult, and the processing has conventionally been performed manually.

SUMMARY OF THE INVENTION

An object of the invention is to provide a tip processing method for a jacketed optical fiber which enables automatic processing on jacketed optical fiber tips, and a multi-functional tip processing apparatus for a jacketed optical fiber, and an apparatus utilizing the aforementioned tip processing method.

According to the first aspect of the present invention, in a tip processing method for performing a plurality of types of tip processing on a jacketed optical fiber comprising at least one optical fiber provided with a jacket, an improved tip processing method for a jacketed optical fiber is provided, in which a desired length of the jacket is removed at the tip of the jacketed optical fiber, with the jacket left at the tip of the jacketed optical fiber and the tip processing is performed with the jacket left at the tip.

Further, according to the second aspect of the present invention, a tip processing apparatus is provided, which is equipped with a holder holding unit for extending the tip of the jacketed optical fiber and holding it in a specified position; a jacket removing unit for removing a desired length of the jacket from the jacketed optical fiber while leaving the jacket at the tip of the jacketed optical fiber; a cleaning unit that performs cleaning processing, cleaning the optical fiber exposed by the removal of the jacket by said jacket removing unit; and a cutting unit that performs cutting processing, cutting the optical fiber cleaned by said cleaning unit to a specified length; and which automatically performs the jacket removal, cleaning and cutting processing.

Preferably, the tip processing apparatus is equipped with an inspection device for inspecting the quality of the cutting processing on the optical fiber following the cutting processing in which the optical fiber is cut to a prescribed length.

Also, preferably, the foregoing holding unit is equipped with a fixing device which fixes the holder holding the jacketed optical fiber onto a movable table in a manner that allows release of the holder, the movable table being allowed to move toward and away from the jacket removing unit.

Furthermore, preferably, the jacket removing unit has a pair of jacket removing devices which clamp the tip of the jacketed optical fiber and remove the jacket from the jacketed optical fiber in cooperation with the holder holding unit, and means for moving each of the pair of the jacket removing units to enable them to clamp the tip of the foregoing jacketed optical fiber.

Preferably, the cleaning unit is located between the holder holding unit and the jacket removing unit, and is configured to clean the optical fiber by wiping it with a wiping material.

Also, preferably, the cleaning unit is equipped with a slide table that can freely move toward and away from the jacket removing unit and a lifting plate that is moved up and down by a driving means installed on said slide table. The lifting plate is configured to include a winder drum around which the wiping material is wound; a pair of gears which roll in the wiping material and engage with each other to feed the wiping material from the winder drum; a guide assembly which guides the wiping material fed from the winder drum; and a clamping means which laterally presses the wiping material fed from the foregoing winder drum and clamps the optical fiber via said wiping material.

Furthermore, preferably, the cutting unit is configured to include a clamping means which clamps the optical fiber in a manner that allows release of the optical fiber and which is located above the foregoing cleaning unit in a manner that allows vertical movement; a precutting means which is installed on said cutting unit in a manner that allows vertical movement and cuts a notch into the optical fiber between the two points clamped by the clamping means, to prepare for cutting; and a pressing means which presses and cuts the optical fiber in the direction orthogonally intersecting with the axis, at the point where the notch was made by the precutting device.

The holder holding unit holds the jacketed optical fiber in a prescribed position, and holds it firmly to prevent it from being pulled out when the jacket is removed.

The jacket removing unit performs the removal processing in which the jacket is removed for a prescribed length from the tip of the jacketed optical fiber. At this time, a prescribed length of the jacket is left at the tip of the jacketed optical fiber.

The cleaning unit performs the cleaning processing by wiping the surface of the optical fiber exposed by the jacket removal.

The cutting unit performs the cutting processing in which the optical fiber exposed by the jacket removal is cut to a specified length.

The inspection means optically inspects whether the cut and processed tip of the optical fiber, which has undergone the cutting and processing steps, is good or bad.

According to the tip processing method of the present invention, since the jacket is removed for a specified length on the tip of the jacketed optical fiber while leaving the jacket on the tip of the jacketed optical fiber, it is easy to handle the jacketed optical fiber for tip processing, the cut processing for trimming the optical fiber to the specified length can be performed properly, and the automation of the tip processing becomes possible.

Also, according to the tip processing apparatus of the invention, a single apparatus has the collective processing functions for automatically performing all processes of removing the jacket from, cleaning, and cutting the tip off, the jacketed optical fiber; therefore, the tip processing becomes simple work that can be performed without human assistance. In addition, automatic processing brings about an excellent effect of enabling processing of multiple jacketed optical fibers in a short period of time without wasteful time.

Further, the tip processing apparatus according to the present invention incorporates multiple processing functions for processing the jacketed optical fiber tips in a single apparatus, resulting in great advantages in terms of practical use, including a shorter handling distance during tip processing, prevention of damaging or staining the jacketed optical fibers or other trouble while handling, and conservation of space due to the reduced size of the apparatus.

The aforementioned and other objects, characteristics, and advantages of this invention will become more apparent from the following detailed description taken in connection with the accompanying drawings.

BRIEF DESCRIPTION OF THE DRAWINGS

FIG. 16 is a plan view of FIG. 15;

DETAILED DESCRIPTION OF THE PREFERRED EMBODIMENTS

Figure 1:
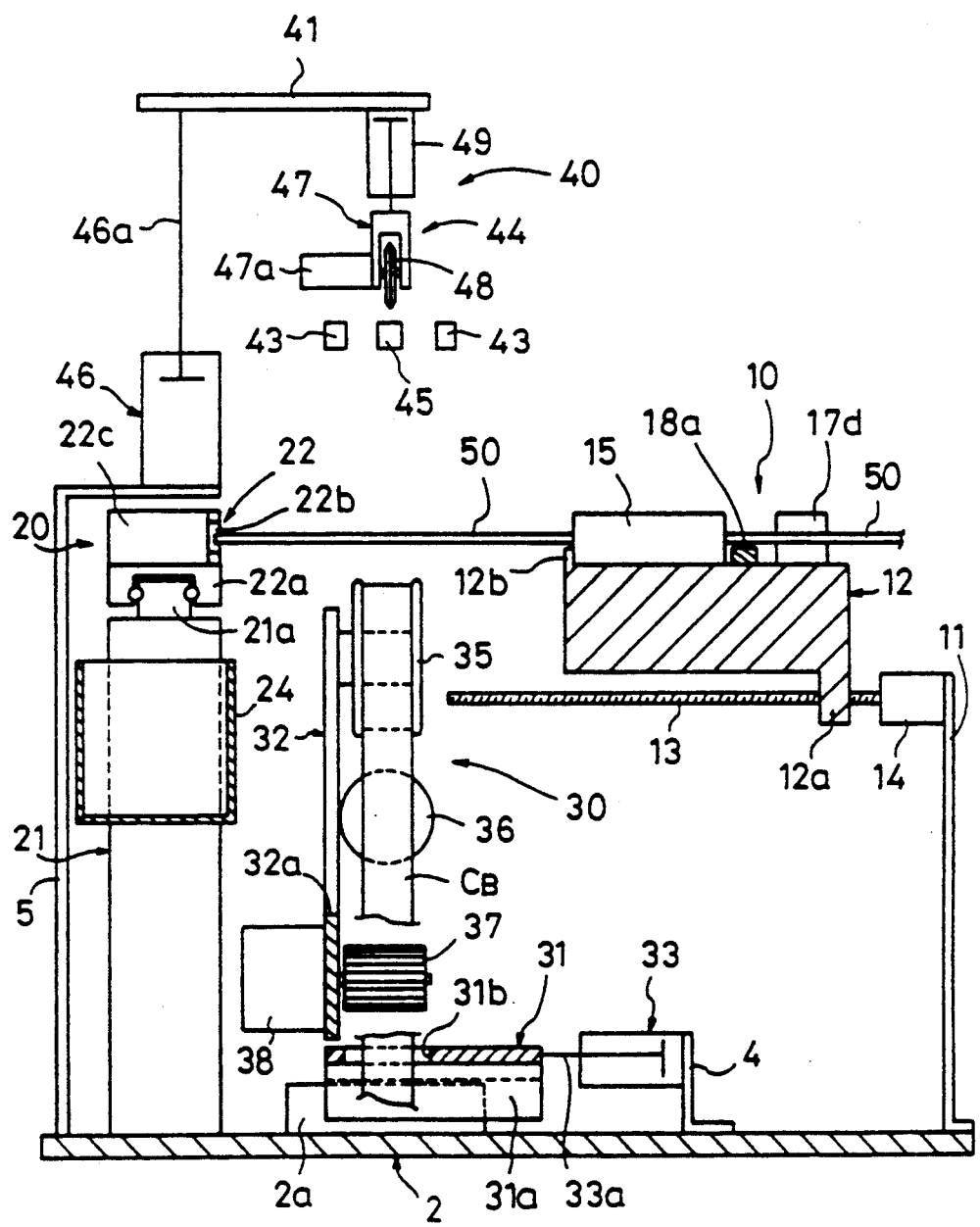
FIG. 1 shows an embodiment of the tip processing apparatus based on the tip processing method according to the present invention, and it is a side view of a partial cross-section of the tip processing apparatus observed from the left side.

An embodiment of the tip processing method and the tip processing apparatus based on the method according to this invention will now be described in detail with reference to FIG. 1 through FIG. 32.

The tip processing apparatus 1 is an apparatus with the so-called three-in-one feature, which incorporates three funtions: jacket removal processing from a jacketed optical fiber, cleaning processing in which the surfaces of exposed optical fibers are wiped, and cutting processing in which the optical fibers are cut to a specified length. As shown in FIG. 1 through FIG. 4, a laser sensor 3, a holder holding unit (hereinafter referred to as simply "holding unit") 10, a jacket removing unit 20, a cleaning unit 30, and a cutting unit 40 are located on the base 2. The figures show the original position before or after operation.

The laser sensor 3 (see FIG. 3) is, for example, a transmission type sensor, and a parallel flux of laser beams is emitted from the light source 3a on one side to the light acceptor 3b on the other side. The tip of a jacketed optical fiber 50, which tip has undergone the tip processing to be described later, is located in the light path formed between the light source 3a and the light acceptor 3b, and the tip processing quality of the jacketed optical fiber 50 is inspected based on the amount of laser light received by the light acceptor 3b.

Figure 27:
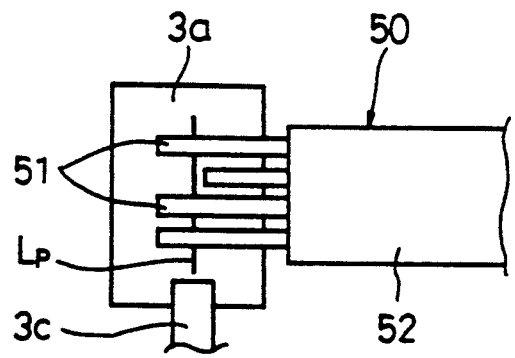
FIG. 27 is a front view of the positional relationship between the optical fibers and the light path when the jacketed optical fiber in FIG. 26 is located in the optical path.
Figure 28:
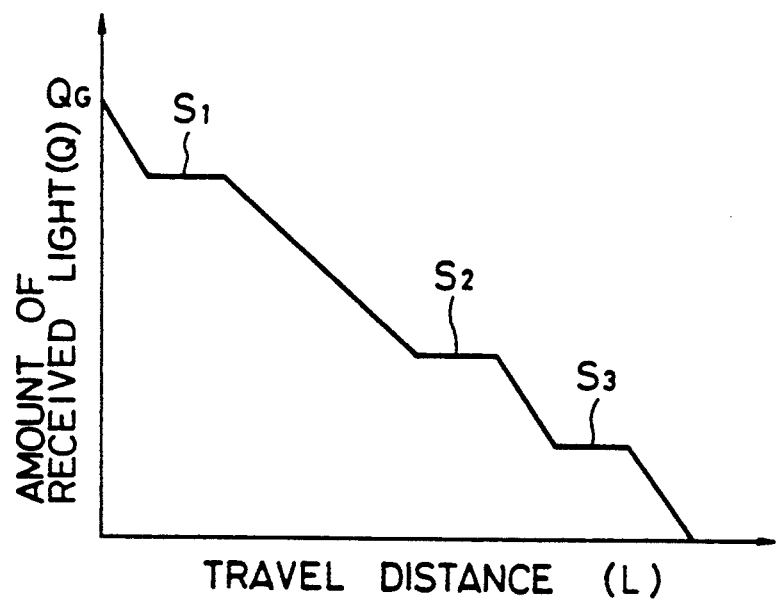
FIG. 28 is a light receiving characteristic chart showing a model of the transitional pattern of the light received by the light acceptor in the state shown in FIG. 27.

In the laser sensor 3, a shield plate 3C is installed on the side of the light source 3a or the light acceptor (light receiver) 3b (see FIG. 27). A laser beam emitted by the light source 3a is shielded at a certain rate by the shielding plate 3C, and the light amount of the laser beam received by the light acceptor (light receiver) 3b is set to change linearly at a certain rate from maximum to zero or from zero to maximum. The use of the laser sensor 3 minimizes fluctuation in intensity of the laser beam emitted from the light source 3, resulting in consistent inspection results.

Figure 3:
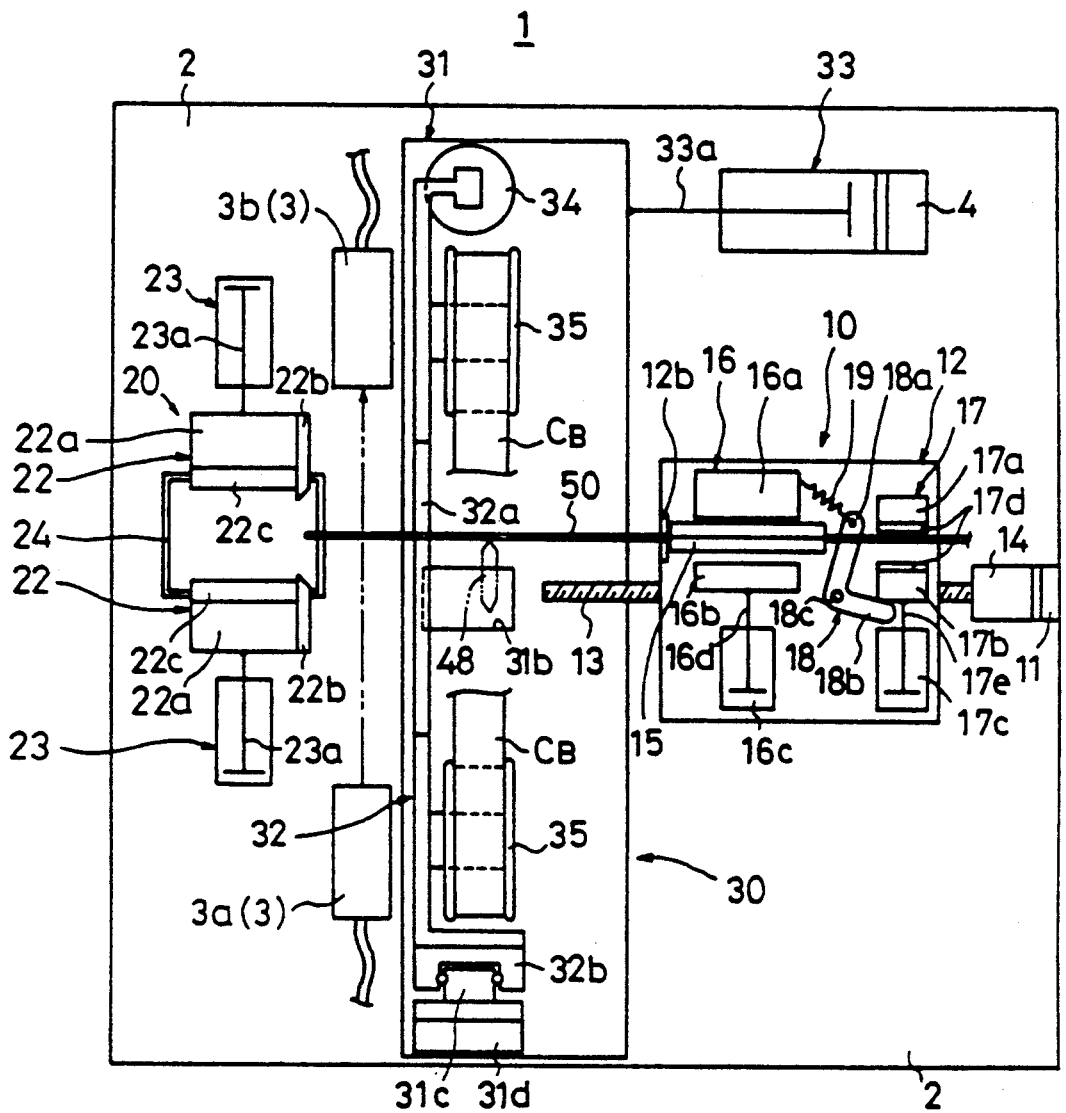
FIG. 3 is a plan view of the tip processing apparatus shown in FIG. 1.

As shown in FIG. 1 and FIG. 3, the holding unit 10 is installed at the top of the support frame 11 erected at the center of one side of the base 2, and is equipped with a movable table 12, shafts 13, and a driving motor 14 which rotates the shafts 13.

As shown in FIG. 1, the movable table 12 is a table with a support assembly 12a mounted on the side of the support frame 11. Two shafts 13 penetrate the center of the support assembly 12a in the longitudinal direction of the apparatus 1, i.e., in the lateral direction in the drawing. The shafts 13 are ball threaded shafts penetrating the support assembly 12a and are allowed to turn by the driving motor 14 installed at the top of the support frame 11. In the attached drawings, however, only one shaft 13 is shown for the sake of simplicity. Thus, the movable table 12 is moved laterally toward or away from the jacket removing unit 20 in the figure via the shafts 13 by the revolution of the driving motor 14 in the normal or reverse direction.

As shown in FIG. 3, on the movable table 12 are installed a fixing means 16 which fixes a holder 15 holding the jacketed optical fiber 50; a clamping means 17 which clamps the jacketed optical fiber 50 extending toward the back from the holder 15; an L-shaped arm 18 which is in contact with the rear of the holder 15 to energize it forward; and a stopper 12b which stops the holder 15, which is energized forward, by contacting the front of the holder 15.

The holder 15 holds the jacketed optical fiber 50 with two pieces of plates hinged together, and it is designed to facilitate the handling of the jacketed optical fiber 50 by the machine. As shown in FIG. 1 and FIG. 3, the holder 15 holds the jacketed optical fiber 50 to be subjected to the tip processing so that the tip protrudes by a prescribed length thereby to nearly reach the jacket removing unit 20.

Figure 5:
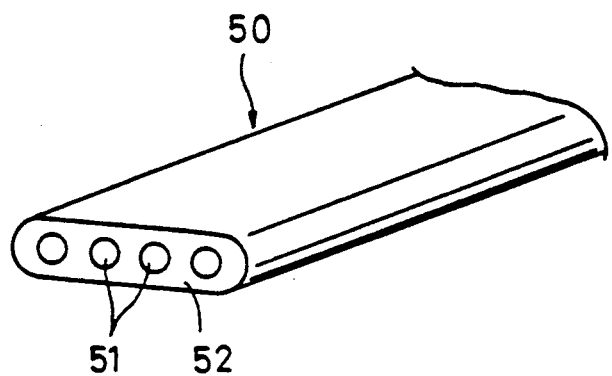
FIG. 5 is a perspective view of a jacketed optical fiber, wherein the tip thereof is to be processed by the tip processing apparatus according to the present invention.

The jacketed optical fiber 50 is, for example, as shown in FIG. 5, a 0.4 mm-thick fiber ribbon comprising a plurality of optical fibers 51 of a 125 μm diameter, which fibers are covered with a synthetic resin jacket 52 into a single piece. The optical fibers 51 are arranged in parallel at certain intervals inside the jacket 52.

The fixing means 16 fixes the holder 15 in place in a manner that allows the holder 15 to be released, and includes a fixing wall 16a, a pressing plate 16b, and a pressing cylinder 16c. The pressing plate 16b is driven by the cylinder rod 16d which comes out of the pressing cylinder 16c and presses the holder 15 against the fixing wall 16a.

The clamping means 17 clamps the jacketed optical fiber 50 so that it does not slip out of the holder 15 while the jacket removing unit 20 and the holding unit 10 work together to remove the jacket from the tip of the jacketed optical fiber 50. The clamping means 17 includes a fixing plate 17a, a claimping plate 17b and a clamping cylinder 17c. On the opposing sides of the plates 17a and 17b, respectively, rubber or other type of frictional pieces 17d and 17d are attached. The clamping plate 17b is driven by a cylinder rod 17e coming out of the clamping cylinder 17c, and clamps the jacketed optical fiber 50 between itself and the fixing plate 17a through the frictional pieces 17d and 17d. The jacketed optical fiber 50 is thus firmly clamped by the clamping means 17 to prevent it from slipping out of the holder 15 during the jacket removal processing.

The arm 18 is located between the fixing means 16 and the clamping means 17, and it includes an energizing arm 18a which energizes the rear of the holder 15, and a release arm 18b which releases the energization. The arm 18 is supported on movable table 12 by a support shaft 18c at the crossing of the arms 18a and 18b, and is allowed to rotate. Also, the arm 18 has a tension spring 19 installed between the end of the energizing arm 18a and the fixing wall 16a, and it is always energized toward the holder 15 so that the energizing arm 18a comes in contact with the rear of the holder 15.

Figure 2:
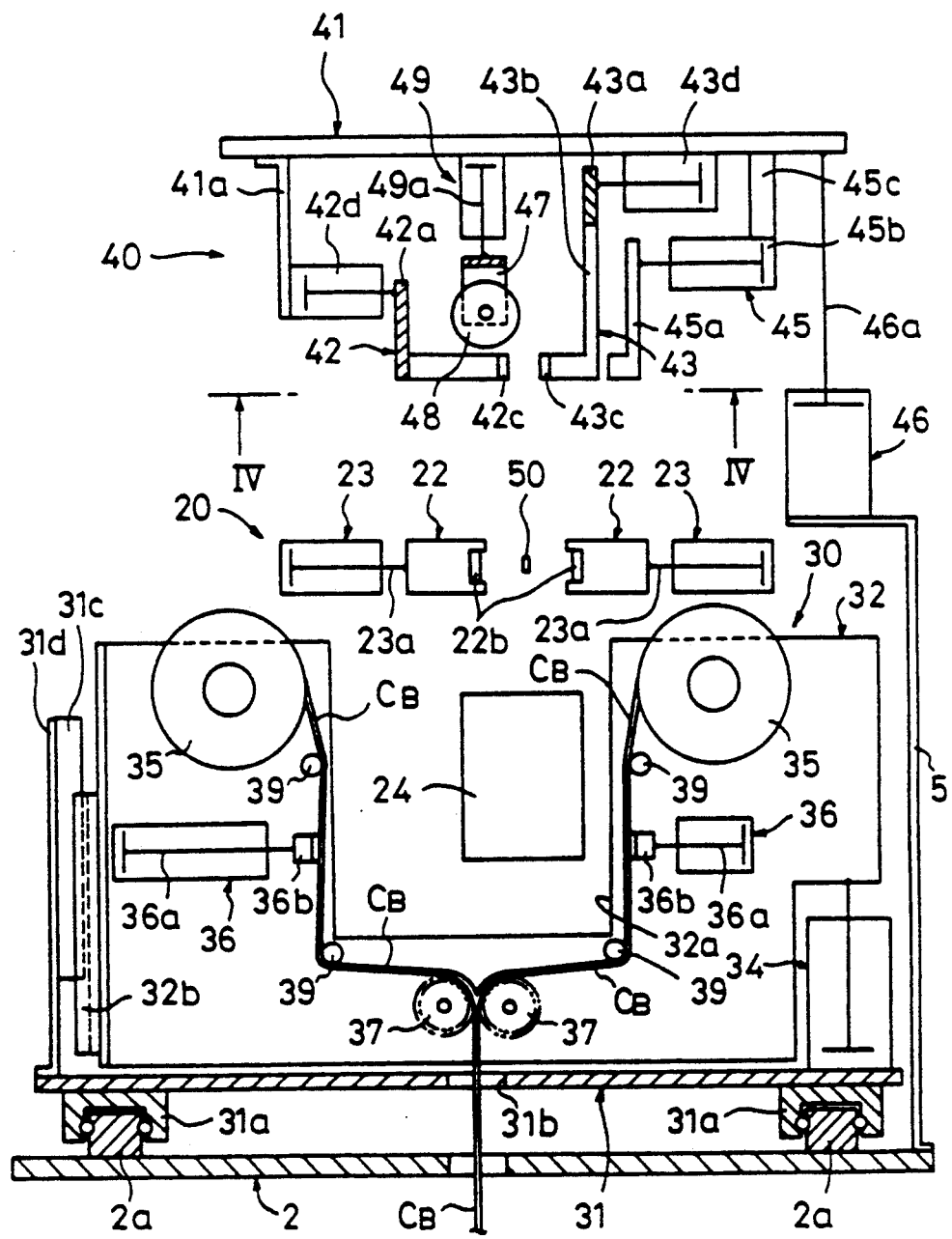
FIG. 2 is a front view of the partial cross-section of the tip processing apparatus shown in FIG. 1.

The jacket removing unit 20 is designed to remove a jacket 52 from the tip of the jacketed optical fiber 50 in cooperation with the holding unit 10, and as shown in FIG. 1 through FIG. 3, it is installed on support bases 21 and 21 (one of them is not illustrated). The jacket removing unit 20 has a pair of peeling means 22 and 22 which remove the jacket 52 from the tip of the jacketed optical fiber 50, and driving cylinders 23 and 23 which moves the individual peeling means 22 toward or away from each other. The support bases 21 and 21 are installed with a certain distance between them in positions so that they face the support frame 11 of the base 2. Right below the peeling means 22 and 22 between the support bases 21 and 21 is located a waste basket 24 which receives fiber wastes from the jacket 52 removed from the jacketed optical fiber 50 or the cut jacketed optical fiber 50, which wastes are produced from the tip processing on the jacketed optical fiber 50.

The peeling means 22 and 22 clamp the tip of the jacketed optical fiber 50 extending from the holder 15, and remove the jacket 52 in cooperation with the movable table 12 which moves toward and away from the jacket removing unit 20. Each peeling means 22 has a slider 22a and a peeling blade 22b as shown in FIG. 1 through FIG. 3. The sliders 22a are assemblies which engage with guide rails 21a mounted on the support base 21 and which are allowed to move in a widthwise direction orthogonally intersecting with the axis of the jacketed optical fiber 50. On the opposing surfaces of the sliders 22a are attached frictional components 22c.

The driving cylinders 23 are installed on the support base 21, and the ends of driving rods 23a are linked to the sliders 22a as shown in FIG. 3. In both cylinders 23, the amount for drawing out the driving rods 23a is set so that, when the driving rods 23a come out, the gap between the peeling blades 22b and 22b becomes slightly larger than the diameter ($=125$ $\mu$m) of the optical fibers 51 of the jacketed optical fiber 50 but smaller than the thickness of the jacket 52.

The cleaning unit 30 is designed to clean the optical fibers 51, which is exposed by removing the jacket 52 from the jacketed optical fiber 50, by wiping off dirt, dust, silicone oil or the like with a wiping cloth $C_B$ to be discussed later, and it is located between the holding unit 10 and the jacket removing unit 20. The cleaning unit 30 has, as shown in FIG. 1 through FIG. 3, a slide table 31 and a lifting plate 32 installed on the table 31 in a manner that it moves up and down.

As shown in FIG. 1 and FIG. 2, the slide table 31 is a wide table which is horizontally installed via sliders 31a and 31a on rails 2a and 2a on both sides of the base 2, and it has an opening 31b nearly at the center of the width. This table 31 is pushed and moved by the push cylinder 33 toward the jacket removing unit 20, i.e., longitudinally toward or away from the support bases 21 and 21, which corresponds to the lateral direction in FIG. 1. As shown in FIG. 1 and FIG. 3, the push cylinder 33 is installed on a support bracket 4 provided on the base 2, and the end of a cylinder rod 33a is linked to a widthwise side of the table 31.

The lifting plate 32 consists of an approximately rectangular plate with its central top portion cut off to form a concave portion 32a as shown in FIG. 2, and it is provided with a slider 32b on its one side. The slider 32b is engaged with a guide rail 31c so that it slides vertically, and the guide rail 31c is mounted vertically on a frame 31d installed on one side of the slide table 31. On the other side of the slide table 31 is mounted a lifting cylinder 34 for moving the lifting plate 32 up and down as shown in FIG. 2.

The lifting plate 32 is provided with winder drums 35 and 35 which are located at the top of both sides of the concave portion 32a, clamping cylinders 36 and 36 being provided under the two drums 35 and 35. The lifting plate 32 is further equipped with a pair of gears 37 and 37 which are meshed with each other below the concave portion 32a and which are mounted on the surface on the side of the holding unit 10. At the back, i.e., on the side of the jacket removing unit 20 is installed a motor 38.

A wiping cloth $C_B$ of a prescribed width and length is wrapped around the winder drums 35 in advance, and it is guided to the meshing point of the gears 37 and 37 through the guide rollers 39 which are installed at appropriate points of the lifting plate 32, then discharged through an opening 31b formed in the slide table 31 at the bottom. For the wiping cloth $C_B$, a nonwoven sheet, which is resistant to solvents and which does not leave lint on the optical fibers 51 after wiping it, is used.

The clamping cylinders 36 push from both sides the wiping cloth $C_B$ which is guided through the guide rollers 39 to the meshing point of the gears 37 and 37, and clamp a plurality of the optical fibers 51 via the wiping cloth $C_B$. The clamping cylinders 36 have cylinder rods 36a and pressing blocks 36b.

The gears 37 and 37 unreel the wiping cloth $C_B$ from winder drums 35 by turning one of the gears 37 by running the motor 38, and discharge used wiping cloth $C_B$ through the opening 31b provided in the slide table 31 at the bottom.

Figure 4:
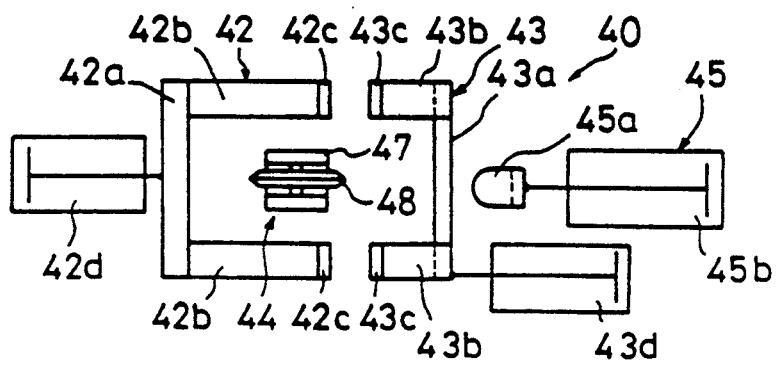
FIG. 4 is a fragmentary view taken in the direction of the arrows along the line IV-IV of FIG. 2.

As shown in FIG. 1 and FIG. 2, the cutting unit 40 is installed above the cleaning unit 30 in a manner that it can move up and down, and it performs the cut processing for trimming a plurality of optical fibers 51 to a specified length after the jacket 52 is removed from the tip of the jacketed optical fiber 50 and the exposed optical fibers 51 are cleaned. The cutting unit 40 is, as shown in FIG. 1, FIG. 2, and FIG. 4, installed on the top of the mounting frame 5 standing on the base 2, and it has clamping assemblies 42 and 43 supported by a support plate 41, a preprocessing means 44, and a pressing means 45.

The support plate 41 is moved up and down by a lifting cylinder 46. As shown in FIG. 2, normally, a rod 46a comes out of the lifting cylinder 46 to locate the support plate 41 above the jacket removing unit 20, and it is lowered only when cutting a plurality of optical fibers 51.

The clamping assemblies 42 and 43 are designed to clamp a plurality of optical fibers 51 at two points by butting their ends each other in a manner that they can release the optical fibers 51. As shown in FIG. 2 and FIG. 4, the clamping assembly 42 has clamping arms 42b and 42b on both sides of the bottom of the support plate 42a, frictional components 42c made of rubber being attached to the ends of the individual arms 42b, and the clamping assembly 42 is pushed and moved by a push cylinder 42d. The push cylinder 42d is attached to a mounting bracket 41a provided on the bottom surface of the support plate 41. On the other hand, the clamping assembly 43 has L-shaped clamping arms 43b and 43b on both sides of the bottom of the support plate 43a, frictional components 43c made of rubber being attached to the fronts of the individual arms 43b, and the clamping assembly 43 is pushed and moved by a push cylinder 43d. The push cylinder 43d is provided on the bottom surface of the support plate 41.

The preprocessing means 44 is designed to notch a plurality of optical fibers 51, which are clamped at two points by the clamping assemblies 42 and 43, and it has a support frame 47, a rotary cutter 48, and a lifting cylinder 49 as shown in FIG. 1 and FIG. 2.

The support frame 47 is a frame shaped like a box with one side open as observed sideways, and it supports the rotary cutter 48 in such a manner that allows rotation. On the side surface is mounted a driving motor 47a for rotating the rotary cutter 48.

The rotary cutter 48 is a disk cutter provided with a blade on its periphery for notching. It is restricted in rotation when cutting a notch in the optical fibers 51, and it is rotated for a prescribed angle by the driving motor 47a each time it performs preprocessing for a specified number of times in order to change the position of a portion of the blade that notches the optical fibers 51.

The lifting cylinder 49, which is provided on the bottom surface of the support plate 41, lowers the support frame 47 when cutting a notch in the optical fibers 51. The end of a rod 49a is linked to the top of the support frame 47.

The pressing means 45 presses and cuts a plurality of optical fibers 51, which have been notched for cutting by the preprocessing means 44, from a direction orthogonally intersecting with the axis, and it has a push arm 45a and a push cylinder 45b as shown in FIG. 2 and FIG. 4.

The push arm 45a consists of an L-shaped member which has a circular arc or flat tip for pressing a plurality of optical fibers 51 as shown in FIG. 4. The push cylinder 45b pushes out the push arm 45a toward the optical fibers 51, and it is supported by a support bracket 45c provided on the support plate 41.

The tip processing apparatus 1 is configured as described above, and it is operated as follows when processing the tip of the jacketed optical fiber 50.

First, the tip processing apparatus 1 is turned ON, and the holder 15 holding the jacketed optical fiber 50 with a specified length jutting out is placed on the movable table 12 of the holding unit 10 in such a manner that the holder 15 contacts the fixing wall 16a of the fixing means 16 as shown in FIG. 3. At this time, the jacketed optical fiber 50 is held in the holder 15 so that its tip is positioned between the peeling blades 22b and 22b of the jacket removing unit 20 as illustrated.

Figure 6:
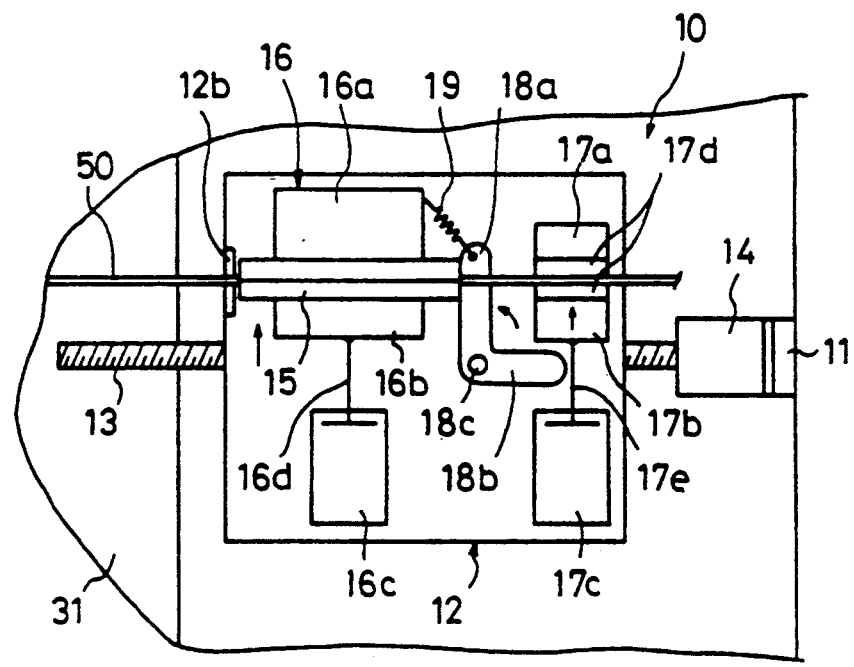
FIG. 6 is an enlarged top view of the holding unit of the tip processing apparatus in FIG. 1 holding the jacketed optical fiber, and of the area around the holding unit.

After that, in the holding unit 10, the pressing cylinder 16c and the clamping cylinder 17c are actuated to cause the cylinder rods 16d and 17e to come out. Thus, as shown in FIG. 6, the pressing plate 16b fixes the holder 15 between the plate 16b and the fixing wall 16a, and the rear of the jacketed optical fiber 50 extending from the holder 15 is firmly clamped by the fixing plate 17a and the clamping plate 17b via the frictional pieces 17d and 17d.

At this time, when the cylinder rod 17e comes out, the release arm 18b comes in contact with the rear of the clamping plate 17b. This causes the arm 18, whose rotation has been inhibited, to rotate counterclockwise around the support shaft 18c by the tensile force of the tension spring 19 as shown by the arrow in FIG. 6. This in turn causes the energizing arm 18a of the arm 18 to push the back of the holder 15 whose front contacts the stopper 12b of the movable table 12, thereby positioning the holder and fixing it between the fixing wall 16a and the pressing plate 16b.

Figure 7:
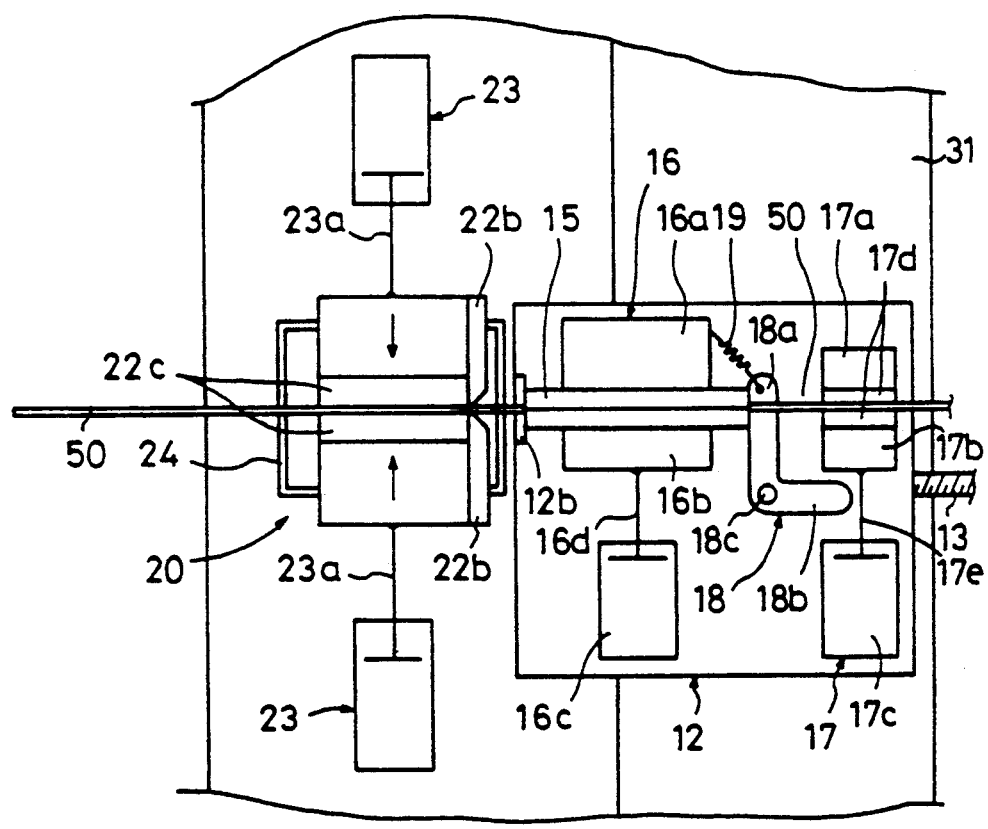
FIG. 7 is an enlarged top view of the jacket removing unit clamping the tip of the jacketed optical fiber held in the holding unit.

Next, the driving motor 14 is actuated to move the movable table 12 to a prescribed position adjacent to the jacket removing unit 20 ahead. In the jacket removing unit 20, as shown in FIG. 7, the driving cylinders 23 and 23 are actuated to cause the driving rods 23a and 23a to come out, and the ends of the peeling blades 22b and 22b clamp the jacket 52 of the jacketed optical fiber 50 at a point away from the tip by a specified distance.

Figure 8:
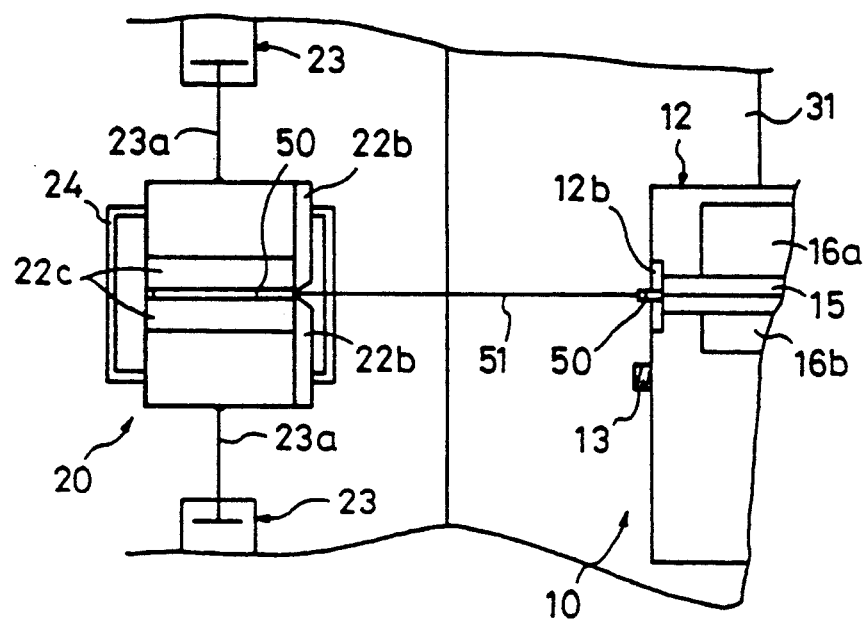
FIG. 8 is an enlarged plan view of the major part of the tip processing apparatus when the jacket of the jacketed optical fiber has been removed by the cooperative operation of the jacket removing unit and the holding unit, while leaving the jacket at the tip to obtain a semi-stripped condition.

Then, the driving motor 14 runs in the reverse direction to draw the movable table 12 back for a specified distance. At this time, the jacket 52 on the tip of the optical fiber 50 is clamped between the peeling blades 22b and 22b, and the rear side extending from the holder 15 is also clamped firmly by the clamping means 17. Thus, as shown in FIG. 8, the jacket 52 is removed from the jacketed optical fiber 50 by a length that corresponds to the retreating distance of the movable table 12, causing a plurality of optical fibers 51 to be exposed with a specified length of the Jacket 52 left on the tip.

Figure 9:
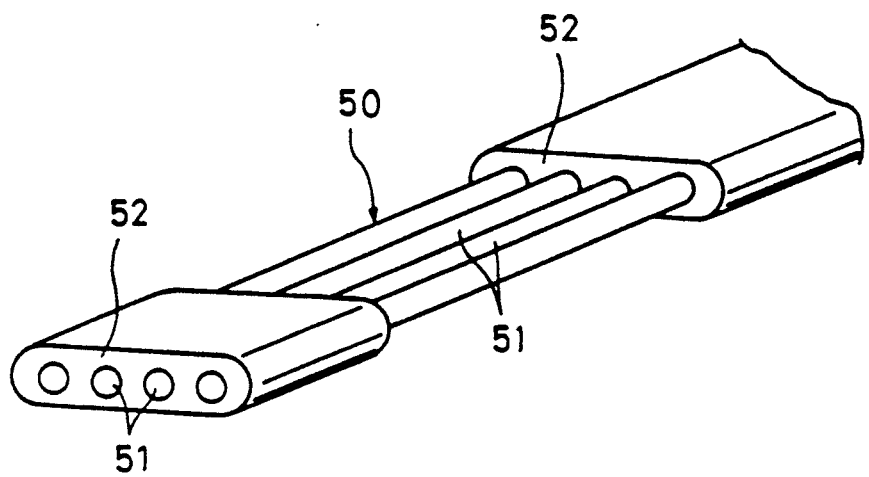
FIG. 9 is a perspective view of the jacketed optical fiber in the semi-stripped condition shown in FIG. 8.

The jacketed optical fiber 50 is now in a condition where it has the jacket 52 left on its tip and a plurality of the optical fibers 51 partially exposed for the specified length as shown in FIG. 9. This condition is referred to as a "semi-stripped condition." When the jacketed optical fiber 50 is semi-stripped in this way, the exposed optical fibers 51 do not separate or become loose while they would if the jacket 52 were to be removed all up to the tip. Therefore, the optical fibers 51 no longer require a step to rearrange them in parallel, permitting smooth operations in the subsequent steps such as the cleaning process and the cutting process. It is a major feature of the tip processing method according to the present invention to semi-strip the jacketed optical fiber 50 for the subsequent processing.

Figure 10:
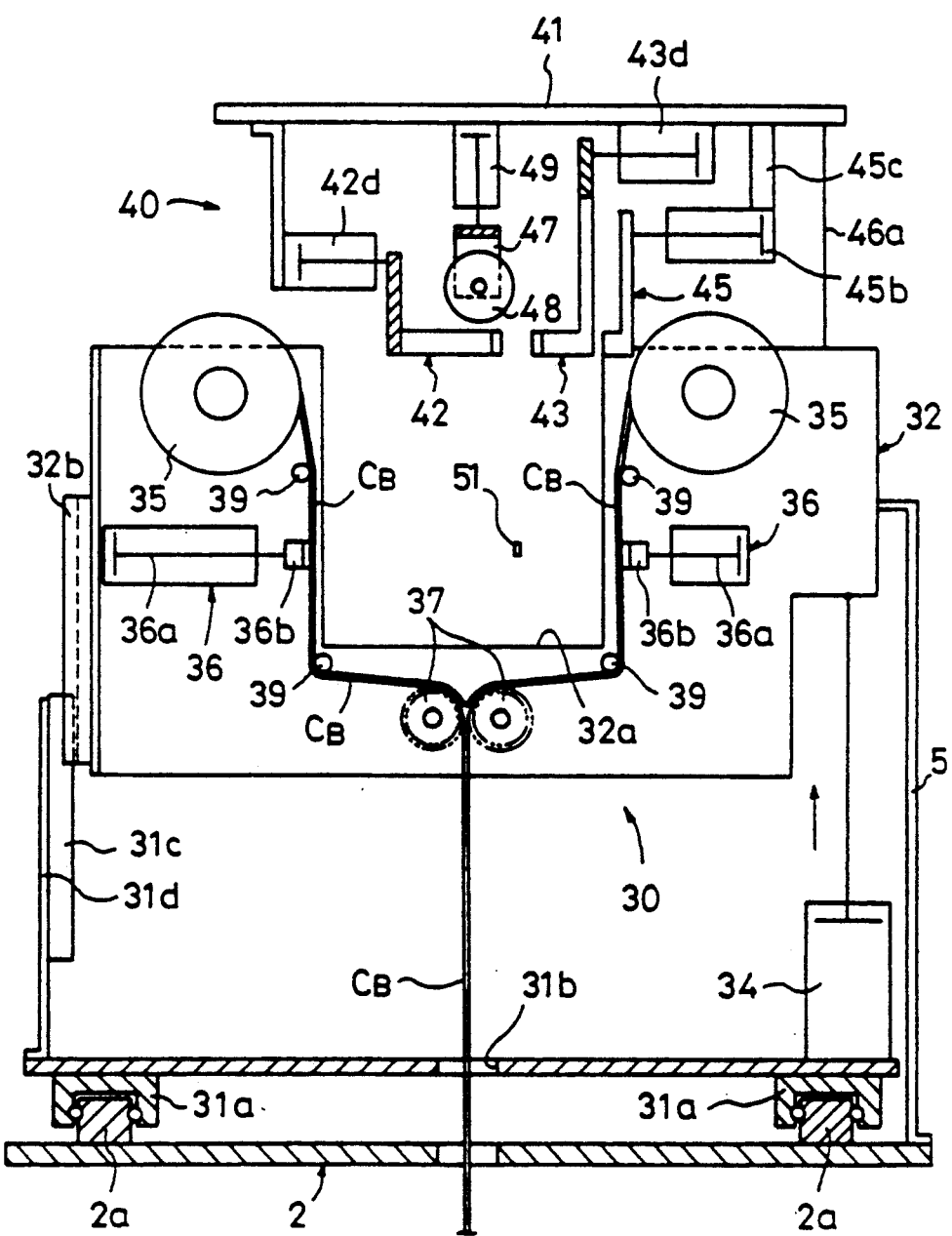
FIG. 10 is a front view of the partial cross-section of the tip processing apparatus when the cleaning unit is raised and activated.

After the jacketed optical fiber 50 is semi-stripped, the cleaning unit 30 is actuated, and the lifting plate 32 is raised by the lifting cylinder 34 as shown in FIG. 10. At this time, the slider 32b is guided by the guide rail 31c to enable the lifting plate 32 to smoothly rise.

Figure 11:
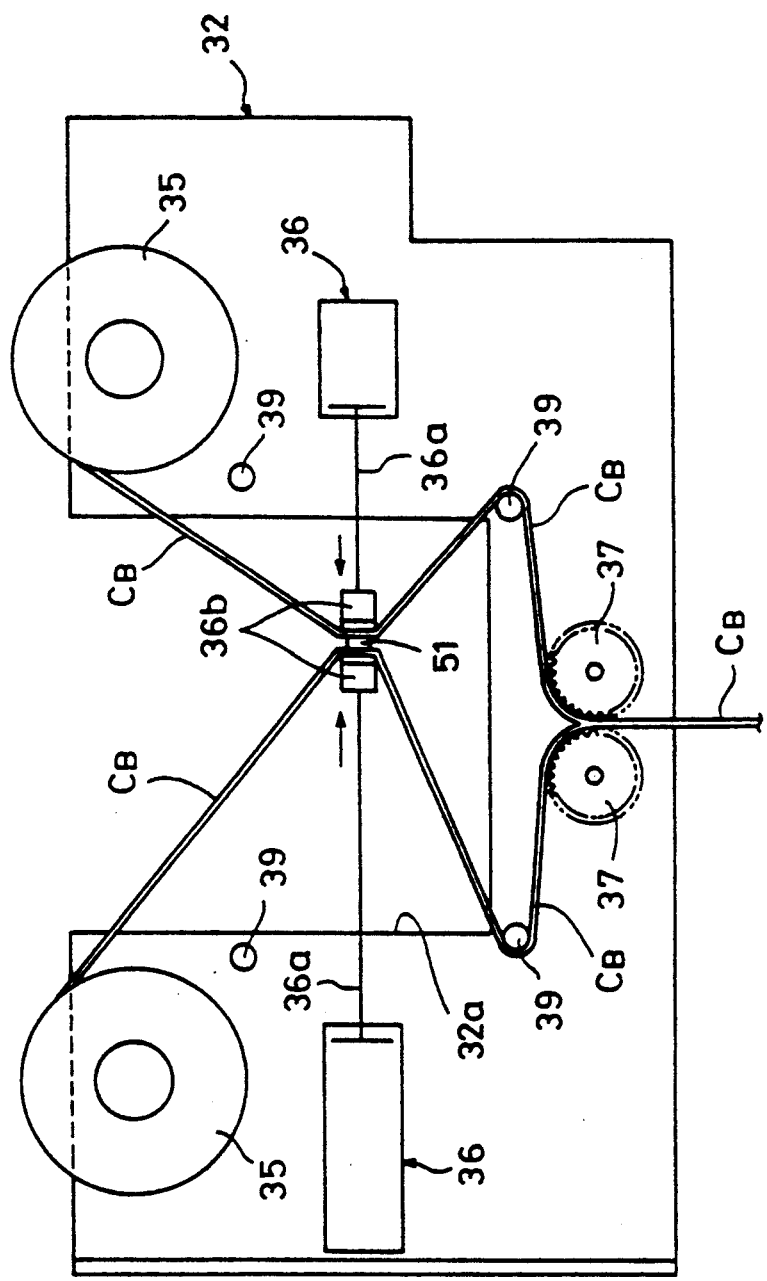
FIG. 11 is a front view of the lifting plate when a plurality of optical fibers are clamped by a clamping cylinder in the cleaning unit.
Figure 12:
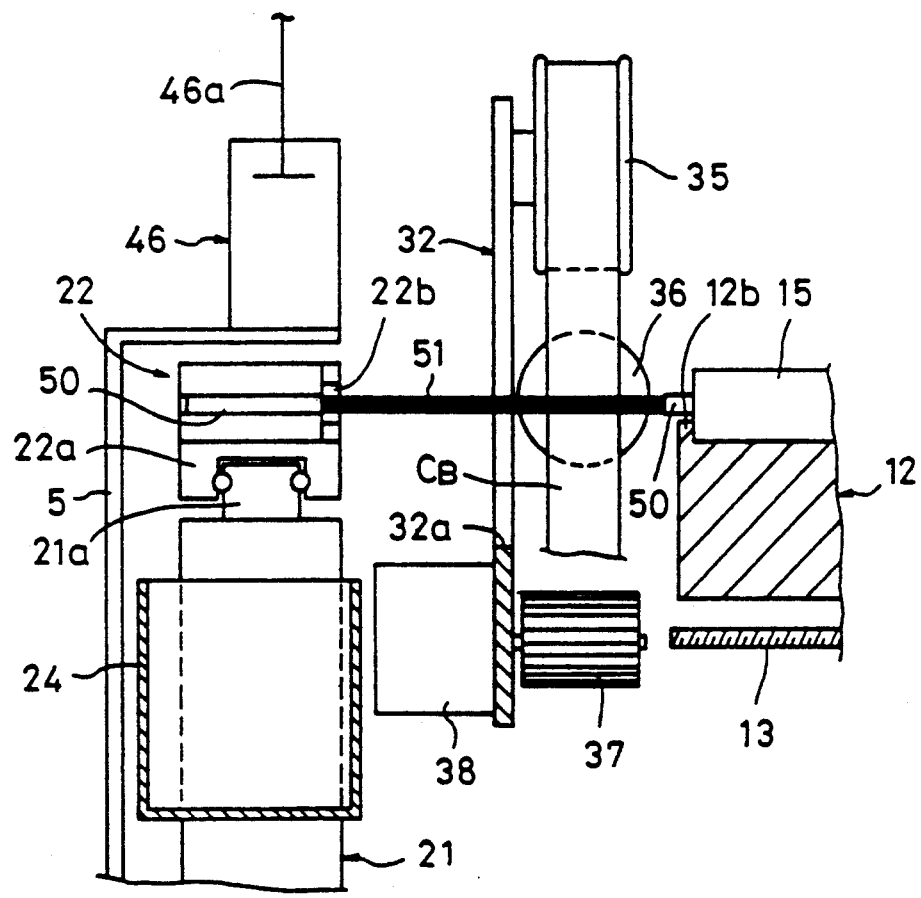
FIG. 12 is an enlarged side view of the cleaning unit observed from the left side in the tip processing apparatus shown in FIG. 11.

Subsequently, a spraying device, which is not shown, applies alcohol to each of the wiping cloth $C_B$ positioned near the pressing blocks 36b of the clamping cylinders 36, then the cylinder rods 36a come out of the clamping cylinders 36. Thus, as shown in FIG. 11 and FIG. 12, the exposed optical fibers 51 of the jacketed optical fiber 50 are clamped by the pressing blocks 36b and 36b through the wiping cloth $C_B$.

Figure 13:
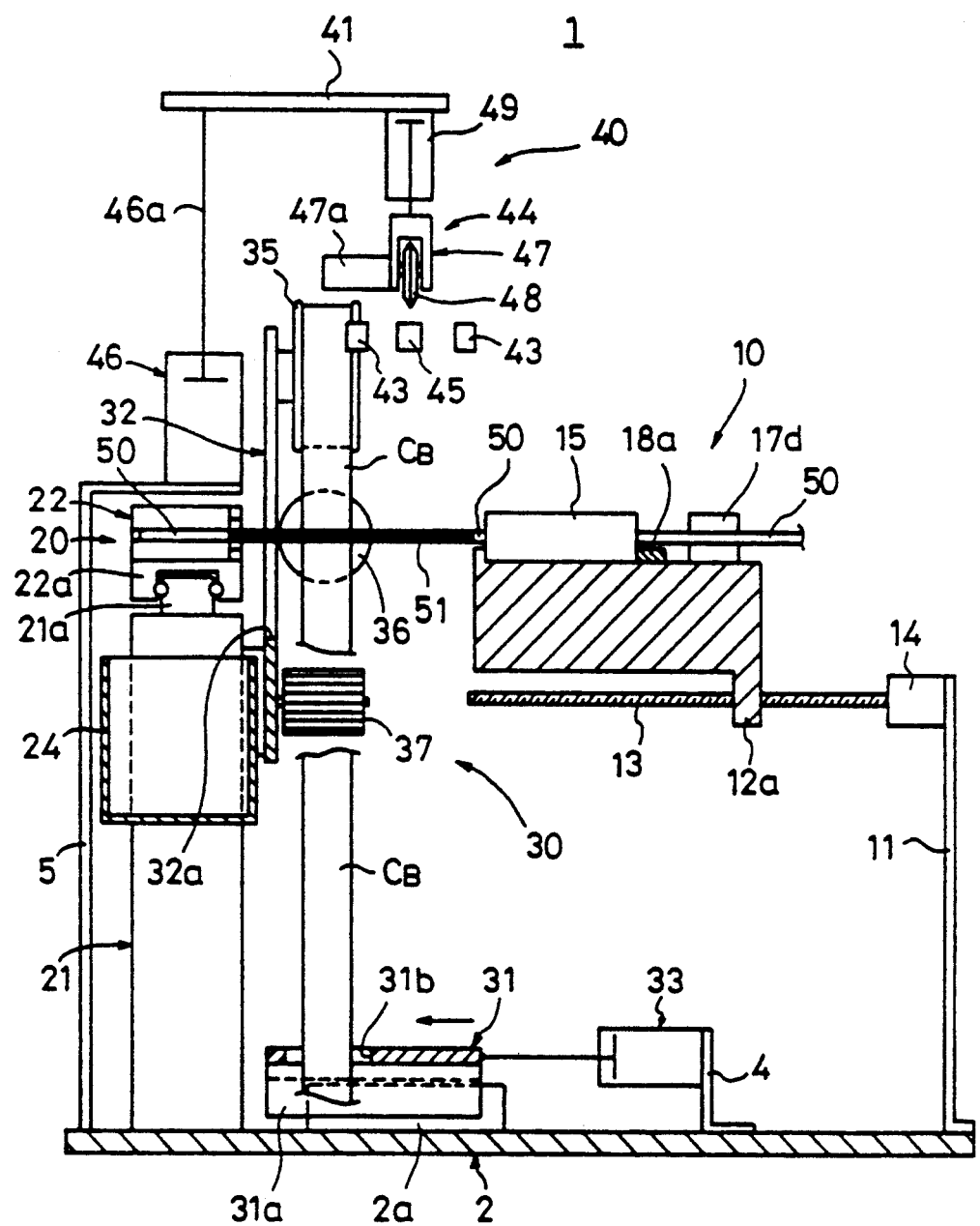
FIG. 13 is a side view of the partial cross-section of the tip processing apparatus shown in FIG. 11, when a plurality of optical fibers have been wiped with a wiping cloth for cleaning.

After that, the push cylinder 33 is actuated to cause the cylinder rod 33a to come out, and as shown in FIG. 13, the slide table 31 is guided by the rails 2a and 2a to advance toward the jacket removing unit 20. Thus, the exposed optical fibers 51 are wiped with the wiping cloth $C_B$ moistened with alcohol, thereby removing dirt, dust or silicone oil or the like from the surfaces of the optical fibers.

At this time, the jacketed optical fiber 50 is firmly clamped by the clamping means 17 at the rear side of the holder 15 of the holding unit 10; and therefore, the jacketed optical fiber 50 is not pulled out of the clamping means 17 even when the pressing blocks 36b and 36b, which hold the optical fibers 51 between them through the wiping cloth $C_B$, advance, so that the semi-stripped optical fibers 51 are completely cleaned with the wiping cloth $C_B$.

When the slide table 31 advances and the wiping of the optical fibers 51 is finished, the cylinder rods 36a of the clamping cylinders 36 retreat, the pressing blocks 36b and 36b release the optical fibers 51, and the cleaning unit 30 is reset to the condition before the wiping process was started as shown in FIG. 10.

Then, the push cylinder 33 moves in the reverse direction to pull back the cylinder rod 33a, and the slide table 31 is retreated. At the same time, the motor 38 is actuated to rotate the gears 37 and 37, unreeling the wiping cloth $C_B$ for a prescribed length from the winder drums 35. This causes the portions of the wiping cloth $C_B$, that has been soiled from wiping, to move down, thus ensuring that the optical fibers 51 are always wiped with clean wiping cloth $C_B$. Further, the wiping cloth $C_B$ that has been soiled from such wiping is successively discharged through the opening 31b in the slide table 31.

In the cleaning unit 30, such wiping operation is repeated a few times before the cleaning processing of the optical fibers 51 is completed. Then, the lifting cylinder 34 moves in the reverse direction to move down the lifting plate 32 as shown in FIG. 14, thereby finishing all steps involved in the cleaning operation implemented by the cleaning unit 30.

Figure 14:
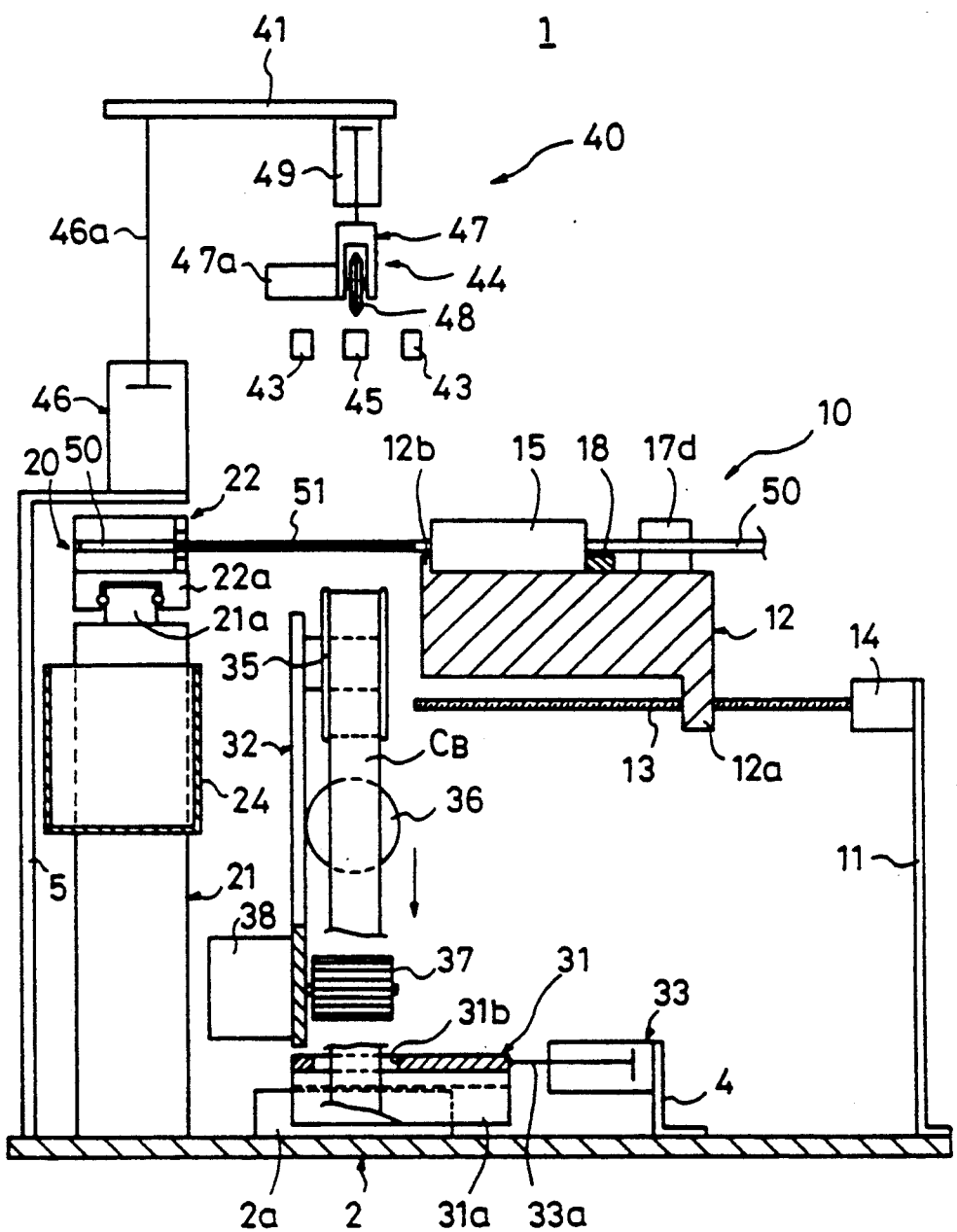
FIG. 14 is a side view of the partial cross-section when the cleaning processing of the optical fibers has been completed with the cleaning unit lowered.
Figure 15:
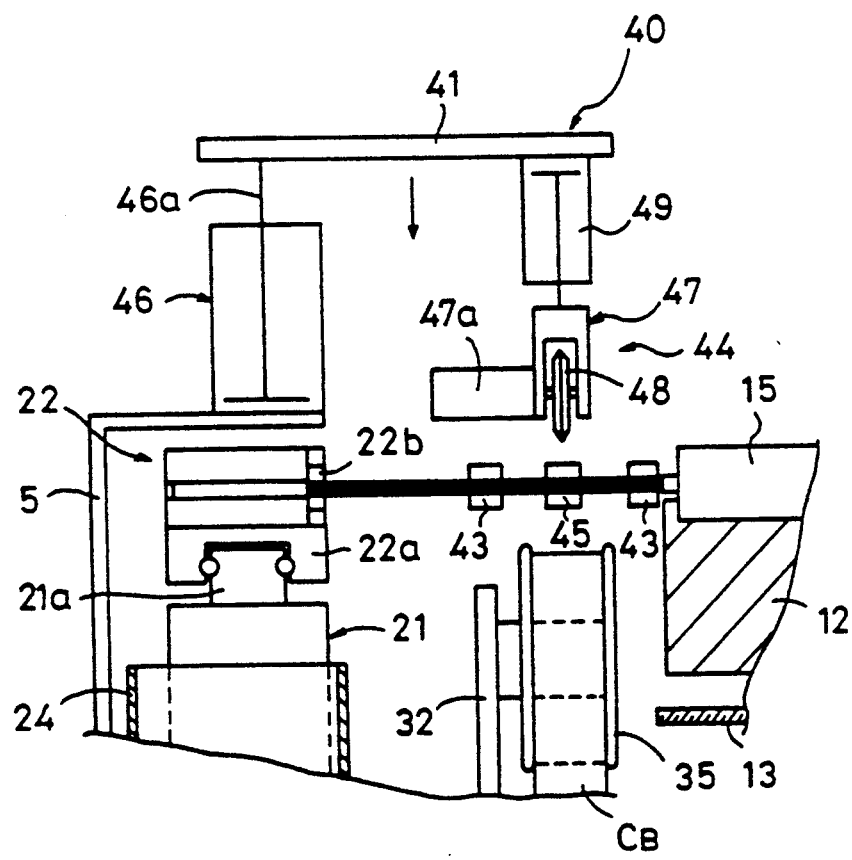
FIG. 15 is an enlarged side view of a major part of the tip processing apparatus with its cutting unit lowered and activated.

Next, the cutting unit 40 starts its operation, the lifting cylinder 46 draws the rod 46a in, and the lifting cylinder 46 lowers the support plate 41 from the position shown in FIG. 14 to the position shown in FIG. 15. The positional relationship between the jacketed optical fiber 50 and the component assemblies of the cutting unit 40 observed from above in such condition is shown in FIG. 16.

Figure 17:
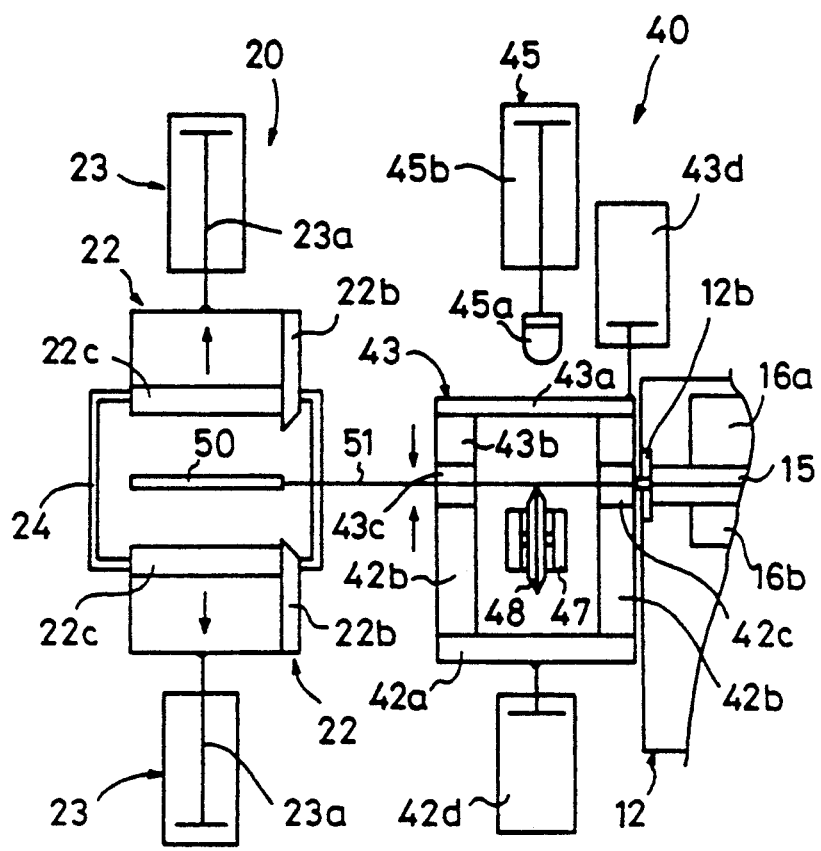
FIG. 17 is an enlarged plan view of a state where the jacketed optical fiber is released from the jacket removing unit and the optical fibers are clamped by clamping assemblies of a cutting unit.
Figure 18:
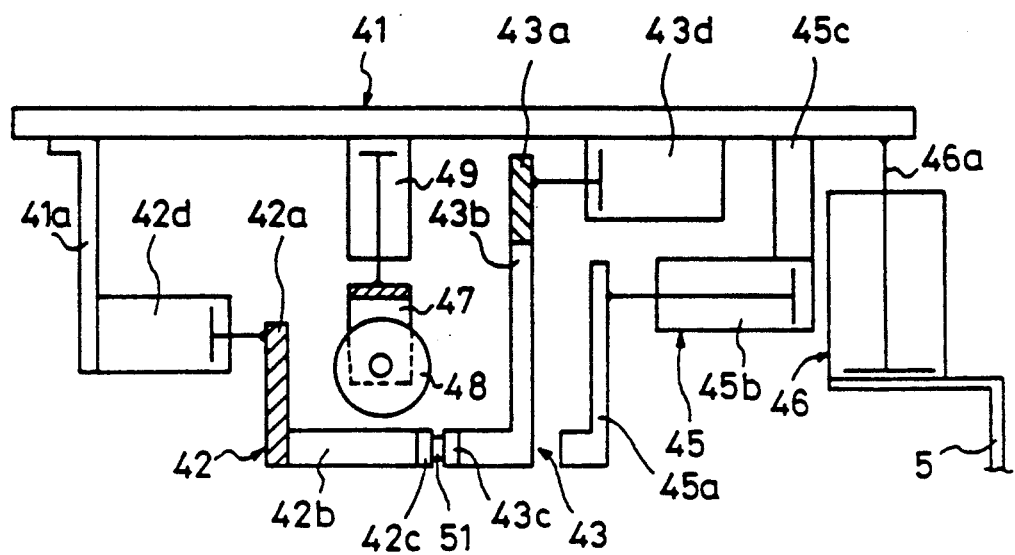
FIG. 18 is an enlarged front view of the cutting unit shown in FIG. 17.

In the subsequent step, as shown in FIG. 17, the push cylinders 42d and 43d are actuated, the clamping arms 42b and 43b of the clamping assemblies 42 and 43 are actuated to clamp the optical fibers 51 at two points, and the driving cylinders 23 of the jacket removing unit 20 move in the reverse direction to draw in the driving rod 23a, releasing the tip of the jacketed optical fiber 50 from the peeling blades 22b and 22b. The front view of the cutting unit 40 under such condition is shown in FIG. 18.

Figure 19:
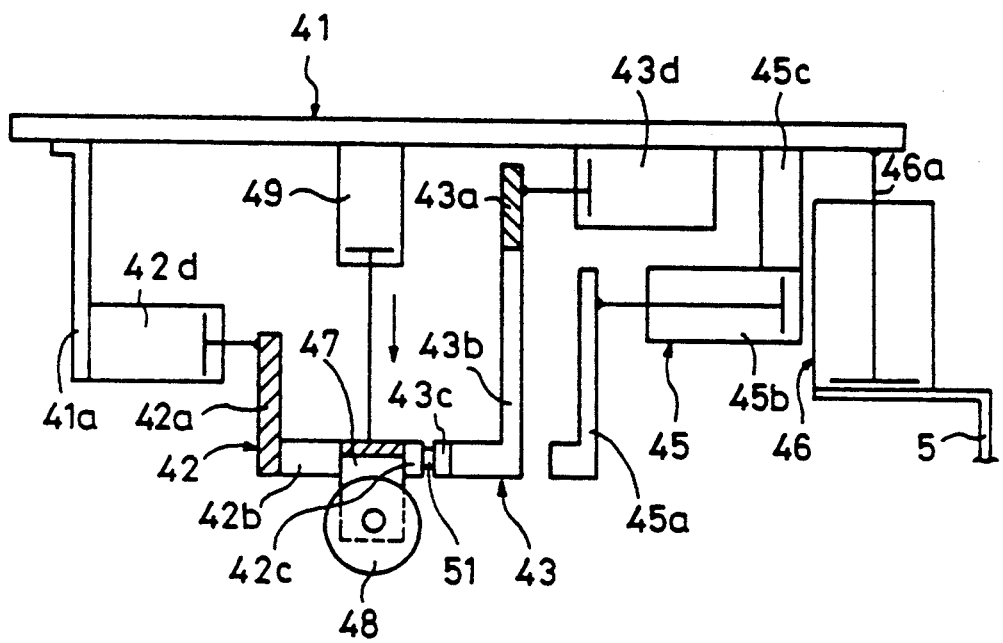
FIG. 19 is a front view of the state shown in FIG. 18, with a rotary cutter lowered and a plurality of optical fibers notched.

After that, as shown in FIG. 19, the lifting cylinder 49 pushes the support frame 47 down, and the rotary cutter 48 cuts a notch in each of the optical fibers 51. At this time, since the optical fibers 51 are semi-stripped, they are bundled in parallel and stay together due to the jacket 52 left on the tip, and each of the optical fibers 51 is notched at a specified point which intersects orthogonally with the axis of the jacketed optical fiber 50.

Figure 20:
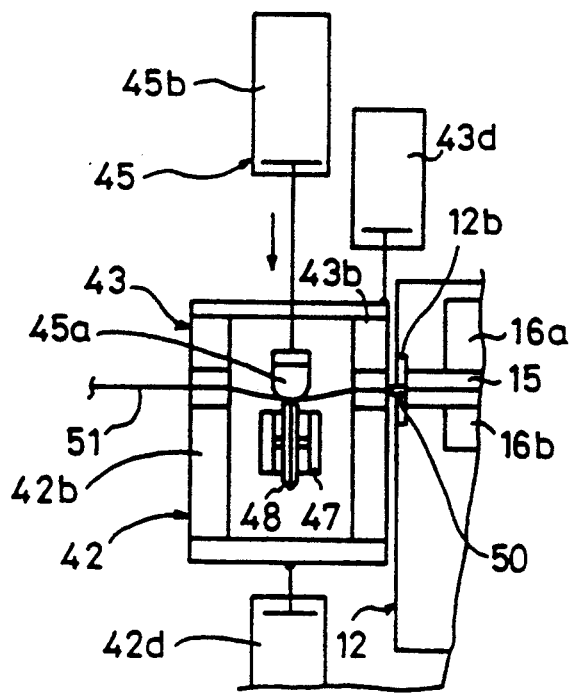
FIG. 20 is an enlarged top view of a major part of the cutting unit during the cutting processing, in which notched optical fibers are trimmed to a specified length.

Subsequently, as shown in FIG. 20, the push cylinder 45b is actuated to push out the push arm 45a. This causes the optical fibers 51, which are clamped by the clamping arms 42b and 43b of the clamping assemblies 42 and 43 at the two points, to be pressed sideways by the tip of the push arm 45a at the notched point and trimmed to a specified length.

Thus, in the tip processing method according to the present invention, the tip processing is performed with the jacketed optical fiber 50 semi-stripped to prevent the optical fibers from becoming loose, making it possible to carry out by the machine a series of steps including the removal of the jacket, and cleaning and trimming of the exposed optical fibers.

Figure 21:
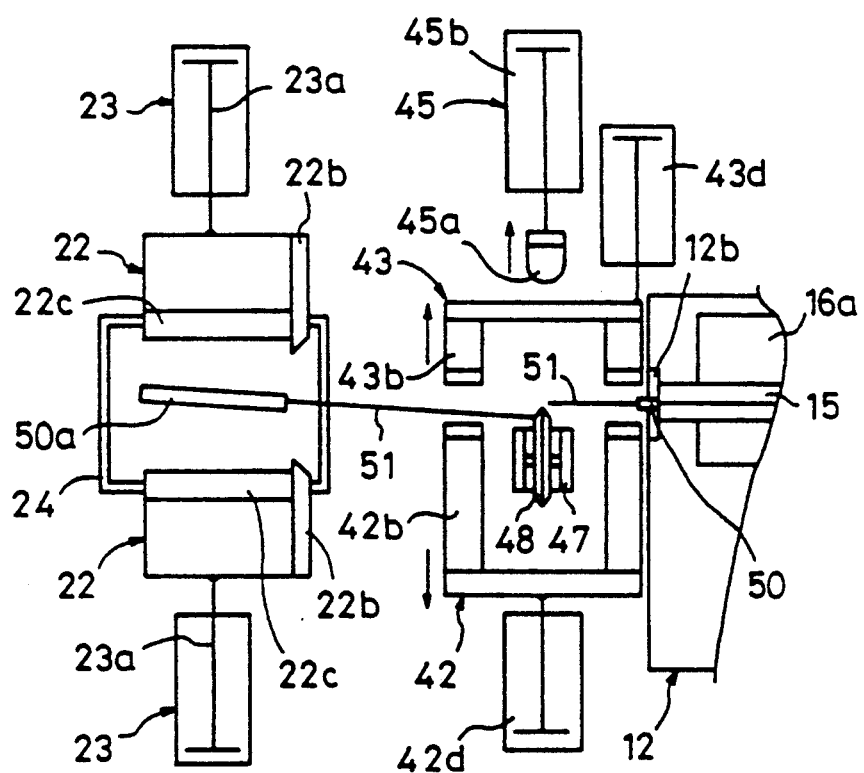
FIG. 21 is the plan view of a state where the cut processing of the optical fibers have been completed with the optical fibers released from the clamping assemblies.

Then, as shown in FIG. 21, the push cylinders 42d and 43d moves in the reverse direction to move back the clamping assemblies 42 and 43, causing the clamping arms 42b and 43b to release the two points of the optical fibers 51, and at the same time, the push cylinder 45a moves in the reverse direction to move the push arm 45a back. Thus, the unnecessary portion 50a trimmed off from the tip of the jacketed optical fiber 50 is dropped into the waste basket 24 located below.

After that, the lifting cylinder 49 pulls up the support frame 47, the rotary cutter 48 returns to its home position, and the lifting cylinder 46 pushes up the support plate 41, completing the cutting process carried out by the cutting unit 40. Incidentally, a portion of the peripheral notching blade on rotary cutter 48 that contacts the optical fibers 51 wears from cutting notches in the optical fibers 51. For this reason, the rotary cutter 48 is rotated for a prescribed angle by the driving motor 47a each time it performs a specified number of the precutting operations, so that the point of the peripheral blade that cuts a notch in the optical fibers 51 is changed.

Figure 22:
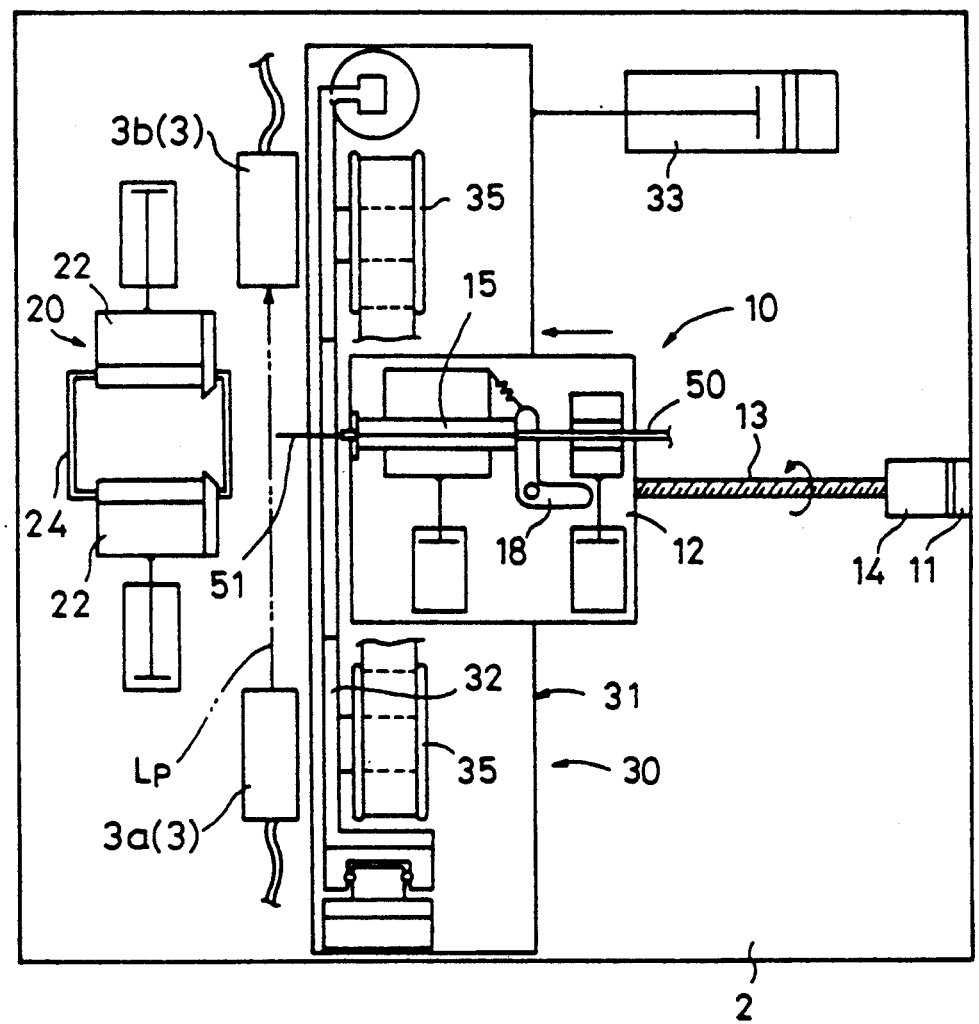
FIG. 22 is a plan view of the tip processing apparatus during the inspection of the trimmed condition of the optical fibers cut to a prescribed length.

Upon completion of the cutting process where the optical fibers 51 are trimmed to the specified length, the laser sensor 3 inspects whether the tips of the optical fibers 51 have been properly processed. More specifically, as shown in FIG. 22, the driving motor 14 is actuated to advance the movable table 12 so that the ends of the optical fibers 51, which have been trimmed, are positioned to orthogonally intersect with a light path $L_P$ of a laser beam shown by a 2-dot chain line in the drawing, then it is determined whether the trimmed conditions are good or bad according to the amount of light received by the acceptor 3b.

Figure 23:
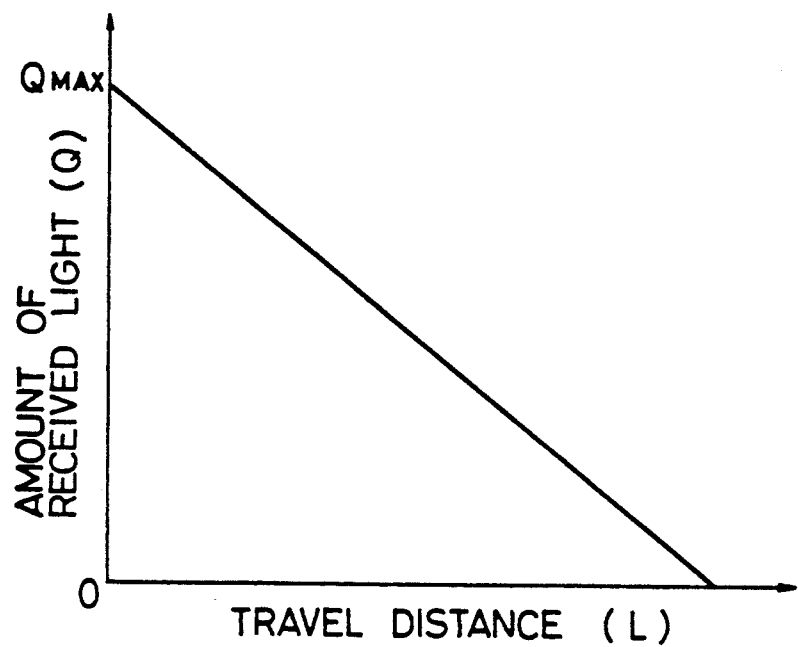
FIG. 23 is a light receiving characteristic chart showing a model of the transitional pattern of the light amount of laser beam received by a light acceptor when no optical fibers are located in the light path of the inspection device.

Here, for example, it is assumed that the laser beam is shielded by the shielding plate 3C installed on the light source 3a and set so that the amount of light of the laser beam received by the acceptor 3b changes linearly at a certain rate from the maximum to zero. In this case, if the ends of a plurality of the optical fibers 51, which have been trimmed, are not placed in the light path $L_P$ of the laser beam, then the linear relationship illustrated in FIG. 23 is established between the travel distance (L) of the shielding plate 3C which shields the laser beam and the received light amount (Q) of the laser beam received by the acceptor 3b. In the chart, $Q_{MAX}$ denotes the amount of received light in a full-light condition where all of the laser beam emitted from the light source 3a reaches the acceptor 3b with the light path $L_P$ not being shielded by the shielding plate 3C.

Figure 24:
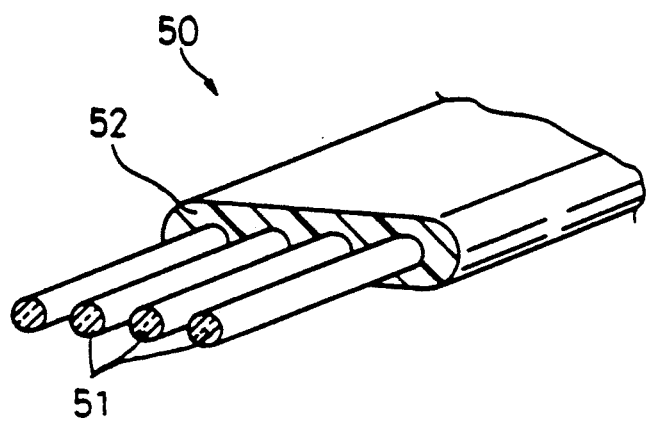
FIG. 24 is a perspective view of the jacketed optical fiber which has been subjected to the tip processing and whose optical fibers have been properly trimmed.
Figure 25:
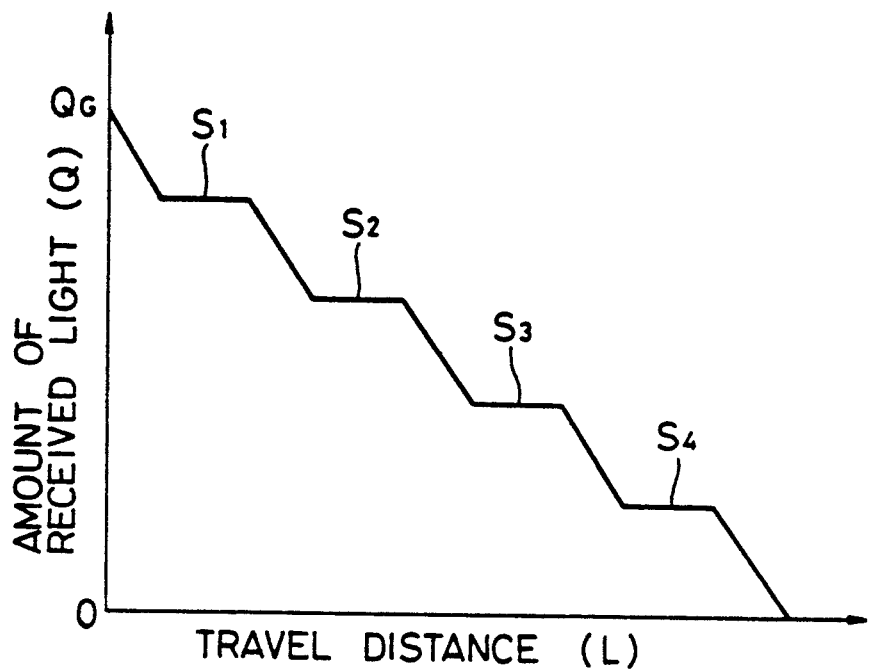
FIG. 25 is a light receiving characteristic chart showing a model of the transitional pattern of the amount of light received by the light acceptor when an optical fiber in FIG. 24 is located in the light path of the inspection device.

As shown in FIG. 24, when the jacketed optical fiber 50 with its tip trimmed properly by successful cut processing is placed so that the ends of a plurality of the optical fibers 51 are positioned in the light path $L_P$, the following takes place: the amount of received light (Q) at the acceptor 3b reduces as the light goes through stages $S_1$ through $S_4$, which correspond to the individual optical fibers 51, as shown by the model of FIG. 25 because the laser beam is shielded by the shielding plate 3C and also the individual optical fibers 51 interfere with the advancing laser beam. In this case, in the chart, the amount of received light $Q_G$ indicates the amount of received light at the acceptor 3b when four optical fibers 51 with good trimmed ends are placed in the light path $L_P$ under the full-light condition. The difference $(Q_{MAX}-Q_G)$ in the amount of received light corresponds to the amount of laser beam shielded by the four optical fibers 51.

Figure 26:
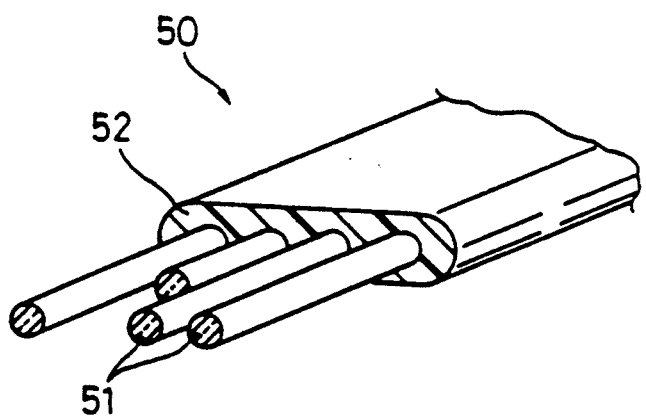
FIG. 26 is a perspective view of the jacketed optical fiber after tip processing, its multiple optical fibers not having been trimmed.

In contrast to the above case, as shown in FIG. 26, for example, if the optical fibers have been defectively trimmed, the second optical fiber 51 being shorter than the rest, then the number of the optical fibers that are placed in the light path $L_P$ will be three as shown in FIG. 27. Accordingly, the amount of received light $Q_2$ at the acceptor 3b under the full-light condition will be a value somewhere between the amount of received light $Q_{MAX}$ and the amount of received light $Q_G$ because of the extra amount of received light from the one optical fiber 51 ($Q_G < Q_2 < Q_{MAX}$). At this time, the amount of received light (Q) at the acceptor 3b changes according to the pattern shown in FIG. 28 wherein the amount of received light under the full-light condition is $Q_2$, there are stages $S_1$ through $S_3$ which correspond to the individual optical fibers 51 placed in the light path $L_P$, and there is no stage that corresponds to the second optical fiber 51.

Figure 29:
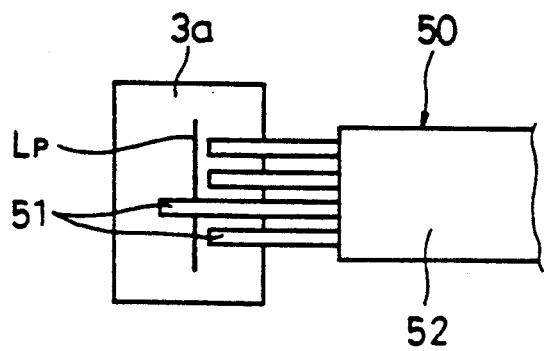
FIG. 29 is the front view of the positional relationship between the optical fibers and the light path when the optical fibers have not been trimmed to the same length, causing one optical fiber to jut out.

Further, as shown in FIG. 29, if the third optical fiber 51 is longer than the rest, then the amount of received light $Q_3$ at the acceptor 3b will be $Q_2 < Q_3 < Q_{MAX}$, and the changing pattern will have a stage that corresponds to the third optical fiber 51.

Therefore, the quality of the trimmed tips can be judged by measuring the amount of light received ($Q_G$) at the acceptor 3b, using optical fibers 51 with properly trimmed tips beforehand, and by comparing an amount of received light (Q) obtained in the inspection with the amount of received light ($Q_G$). Also, the number of optical fibers to be inspected can be determined from the number of stages S that appear in the pattern of the amount of received light (Q) of the laser beam received by the acceptro 3b.

In this case, whether the four optical fibers 51 at the end of the jacketed optical fiber 50 have been properly trimmed and also whether any one particular optical fiber 51 has been defectively trimmed can be mechanically and automatically inspected by combining the pattern of the amount of received light (Q) detected by the acceptor 3b with a comparison system using an electronic control unit (ECU) or the like.

Figure 30:
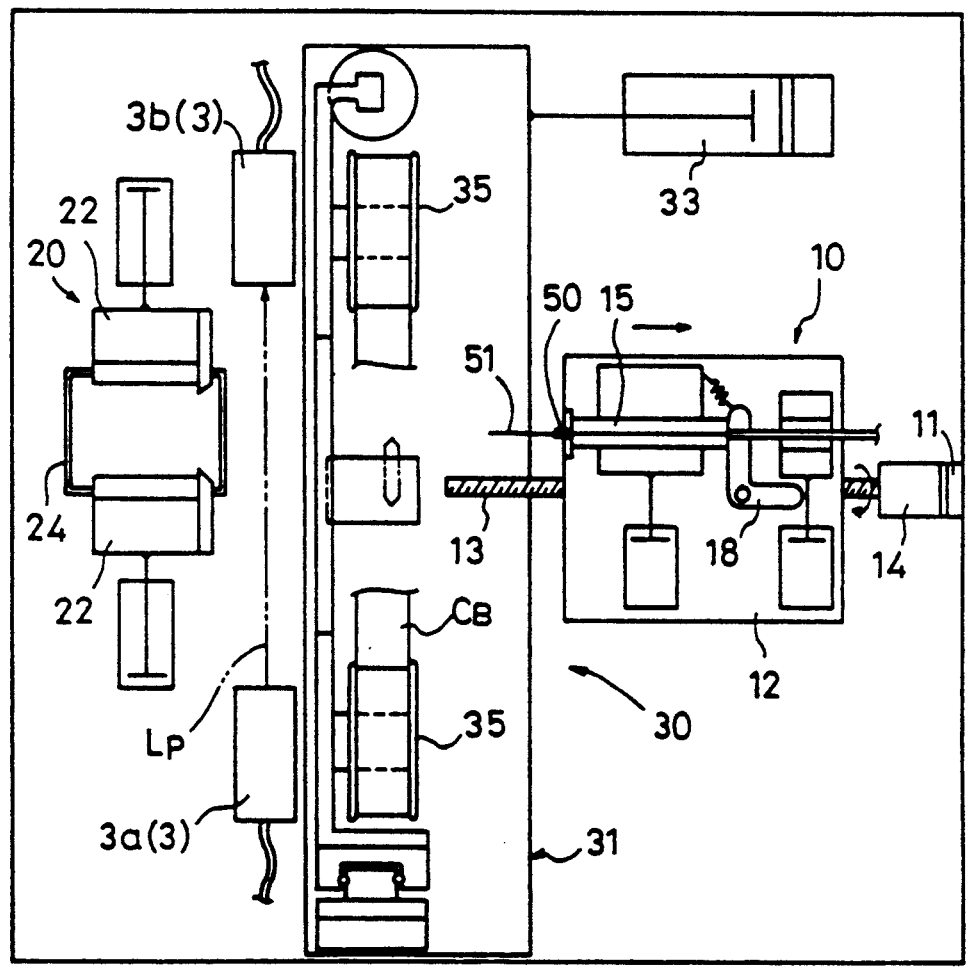
FIG. 30 is a plan view of the tip processing apparatus when the cut processing of the optical fibers has been completed with the movable table in the holding unit returned to its home position.

When the inspection of the quality of the trimmed tips of the optical fibers 51 is completed, the driving motor 14 is operated in the tip processing apparatus, and the movable table 12 is reset to the home position as shown in FIG. 30.

After that, in the holding unit 10, the clamping cylinder 17c draws the cylinder rod 17e back to release the jacketed optical fiber 50 from the clamping assembly 17, and the pressing cylinder 16c draws the cylinder rod 16d in to release the holder 15, restoring the initial state as illustrated in FIG. 3. At this time, as the cylinder rod 17e draws back, the release arm 18b is pushed back at the rear of the clamping plate 17b. Therefore, the arm 18 turns clockwise around the support shaft 18c against the tension spring 19, releasing the energizing force that pushes the rear of the holder 15 toward the jacket removing unit 20.

As described above, the operation of each section in each step mentioned above is sequentially executed in accordance with the preset order. However, the operation of each section may alternatively be controlled in accordance with a preset program by using the electronic control unit (ECU).

Further, the tip processing apparatus 1 in the foregoing embodiment was explained referring to a case where a fiber ribbon, i.e., a multi-core fiber, was used as the jacketed optical fiber 50 to be subjected to the tip processing. However, a single-core fiber is of course applicable to the tip processing.

Figure 31:
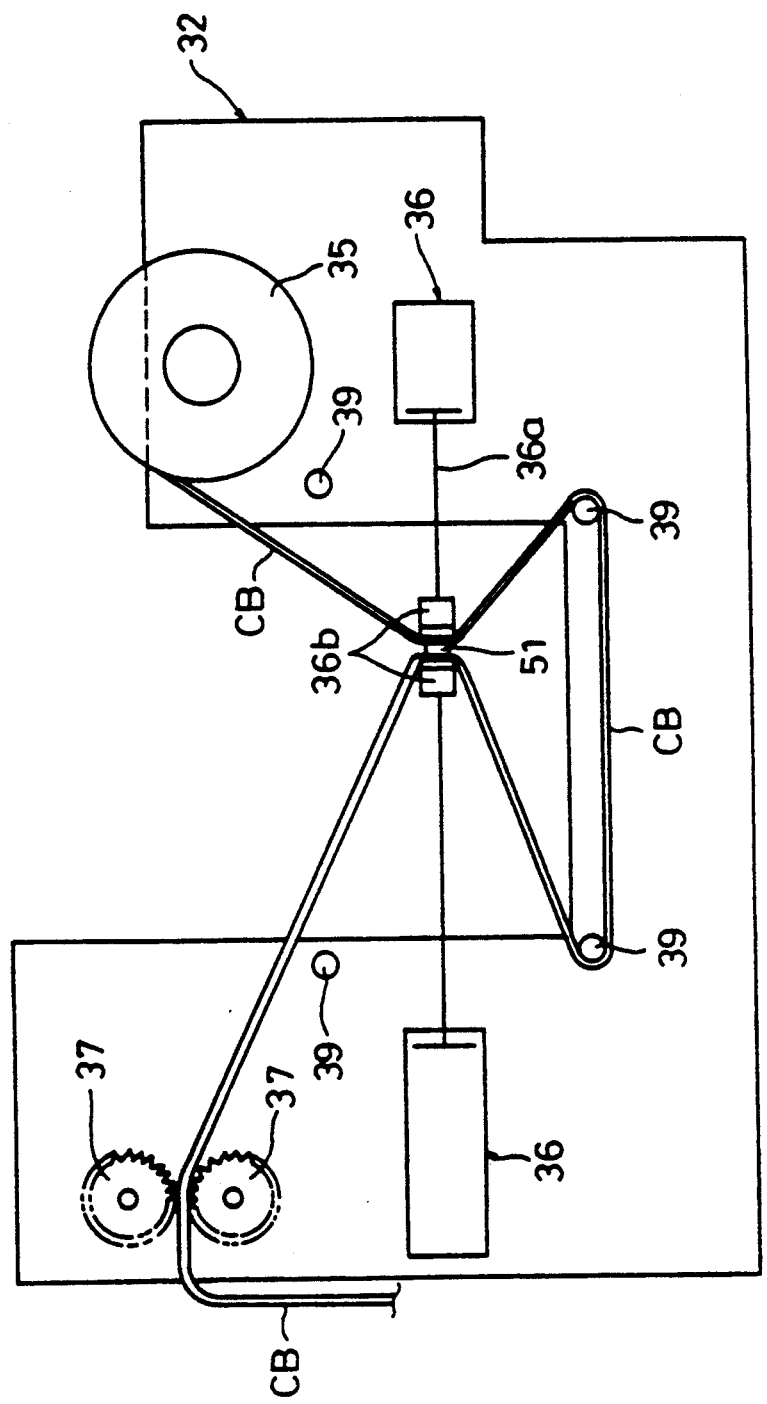
FIG. 31 is an enlarged front view of the lifting plate showing a modification wherein a single winder drum is provided.

Additionally, in the foregoing embodiment, two winder drums 35 are provided at the top on both sides of the lifting plate 32, but only one winder drum may be provided instead. For instance, as shown in FIG. 31, the winder drum 35 may be installed at top right of the lifting plate 32, gears 37 and 37 at top left, so that the wiping cloth $C_B$ is guided to the gears 37 and 37 through a plurality of guide rollers 39. In this way, the number of the winder drums can be reduced, adding to the freedom of the layout of diverse components or assemblies mounted on the lifting plate 32.

Figure 32:
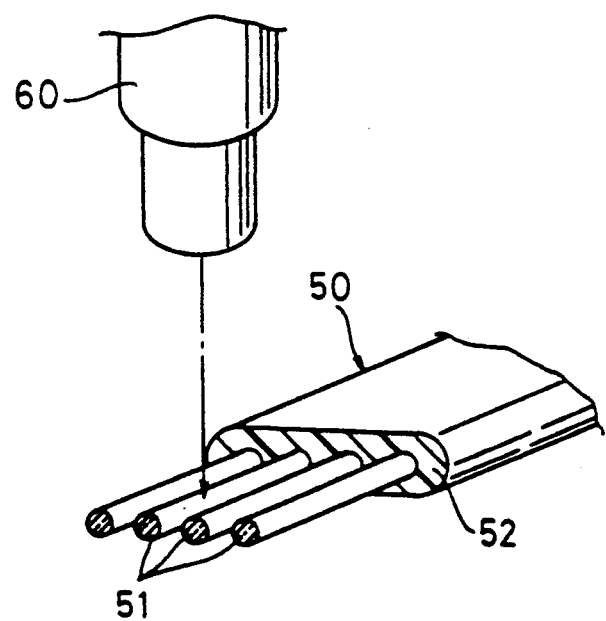
FIG. 32 is a perspective view illustrating optical fibers inspection using a CCD camera as the inspection means.

Furthermore, as the inspection means for inspecting the quality of a processed tip of a jacketed optical fiber, for example, as shown in FIG. 32, a CCD (charge coupled device) camera 60 may be used to photograph the optical fibers 51 of the jacketed optical fiber 50 to be inspected, so that the tip of each of the optical fibers 51 is inspected according to the photograph.

The CCD camera 60 is designed to form images related to the optical fibers 51 on an imaging device such as the CCD in order to obtain images by taking reflecting light from the optical fibers 51 in terms of an electronic change. Then, by subjecting the images concerning the optical fibers 51 taken by the CCD camera 60 to image processing, it is made possible to check the individual optical fibers 51 for defective trimming, and identify any particular optical fiber with a defectively trimmed tip, and it is also possible to inspect the optical fibers 51, that have been photographed, for cleanliness and for any obliquely trimmed tips.

What is claimed is:

1. A tip processing apparatus for processing a tip of a jacketed optical fiber, the tip processing apparatus comprising:

a holder holding unit including fixing means for fixing a holder, which holder extends a tip of a jacketed optical fiber comprising at least one optical fiber with a jacket therearound, and which holder holds the jacketed optical fiber in a specified position in a manner that allows release of the holder from the holder holding unit;

a jacket removing unit for clamping the tip of the jacketed optical fiber, and for leaving the jacket on the tip of the jacketed optical fiber hold by the holder in cooperation with said holder holding unit, thus peeling the jacket off of the jacketed optical fiber by a desired length;

a cleaning unit for cleaning the optical fiber exposed by the jacket peeling carried out by said jacket removing unit, said cleaning unit being located between said holder holding unit and said jacket removing unit;

said cleaning unit comprising:

a wiping material for cleaning the optical fiber;

a slide table which is movable toward and away from said jacket removing unit; and a lifting plate which is movable up and down by a driving means mounted on said slide table; and on said lifting plate are mounted winder drums wrapped with said wiping material, a pair of gears which roll in said wiping material and which mesh with each other to unreel said wiping material from said winder drums, guide assemblies which guide the wiping material unwound from said winder drums, and a clamping means for pressing sideways the unwound wiping material and for clamping the optical fiber through said wiping material; and a cutting unit for performing cut processing on the optical fiber to trim the optical fiber cleaned by said cleaning unit, said cutting unit comprising:

clamping means, arranged adjacent to said cleaning unit, for clamping the optical fiber at two points in a manner that allows release of the optical fiber;

processing means for cutting a notch in the optical fiber at a point between the two points clamped by the clamping means; and processing means for pressing the optical fiber at the point notched by said processing means from a direction that orthogonally intersects with an axis extending along the optical fiber.

2. The tip processing apparatus according to claim 1, wherein said processing means for cutting said notch includes a disk rotary cutter having a notching blade formed on its periphery, and a rotating mechanism for rotating the notching blade.

3. The tip processing apparatus according to claim 1, further comprising inspection means for inspecting a quality of the cut processing of the optical fiber which has been subjected to the cut processing to thereby trim the optical fiber to a specified length.

4. The tip processing apparatus according to claim 3, wherein said inspection means comprises:

a light source which emits inspection light;

a light receiver which receives the inspection light emitted from the light source; and means for placing the tip of the optical fiber in an inspection light path formed between said light source and said light receiver, so as to inspect, according to the inspection light detected at the light receiver, whether the optical fiber has been properly trimmed.

5. The tip processing apparatus according to claim 4, wherein said inspection means comprises an image processing device which subjects pictures of the tip of the optical fiber to image processing, so as to inspect, according to said inspection light detected at said light receiver, whether the optical fiber has been properly trimmed.

6. The tip processing apparatus according to claim 1, wherein said fixing means of said holder holding unit is mounted on a movable table which is movable toward and away from said jacket removing unit.

7. The tip processing apparatus according to claim 1, wherein said jacket removing unit comprises:

a pair of jacket removing means which clamps the tip of the jacketed optical fiber, and which peels the jacket from the jacketed optical fiber in cooperation with said holder holding unit; and means for moving each of said pair of jacket removing means toward and away from said tip of said jacketed optical fiber so that they can clamp said tip.

* * * * *